United States Patent
Kazmi

(10) Patent No.: US 8,180,321 B2
(45) Date of Patent: May 15, 2012

(54) RECOVERY OF LOST REVENUE IN PREPAID CALLS

(75) Inventor: Mustafa Anwar Kazmi, Atlanta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 988 days.

(21) Appl. No.: 11/861,339

(22) Filed: Sep. 26, 2007

(65) Prior Publication Data
US 2009/0081988 A1 Mar. 26, 2009

(51) Int. Cl.
*H04M 11/00* (2006.01)

(52) U.S. Cl. ... 455/406; 455/405; 455/408; 379/114.03; 379/114.27; 379/114.28

(58) Field of Classification Search .................. 455/405, 455/406, 408; 379/114.03, 114.27, 114.28
See application file for complete search history.

(56) References Cited

U.S. PATENT DOCUMENTS

| | | |
|---|---|---|
| 5,123,111 A | 6/1992 | Delory et al. |
| 5,353,335 A | 10/1994 | D'Urso et al. |
| 5,355,406 A | 10/1994 | Chencinski et al. |
| 5,448,633 A | 9/1995 | Jamaleddin et al. |
| 5,488,650 A | 1/1996 | Greco et al. |
| 5,493,608 A | 2/1996 | O'Sullivan |
| 5,511,114 A | 4/1996 | Stimson et al. |
| 5,537,594 A | 7/1996 | Shannon et al. |
| 5,592,535 A | 1/1997 | Klotz |
| 5,621,731 A | 4/1997 | Dale et al. |
| 5,722,067 A | 2/1998 | Fougnies et al. |
| 5,737,393 A | 4/1998 | Wolf |
| 5,737,701 A | 4/1998 | Rosenthal et al. |
| 5,771,276 A | 6/1998 | Wolf |
| 5,812,639 A | 9/1998 | Bartholomew et al. |
| 5,867,570 A | 2/1999 | Bargout et al. |

(Continued)

FOREIGN PATENT DOCUMENTS

EP 1030506 8/2000

(Continued)

OTHER PUBLICATIONS

Mouly, Michel and Pautet, Marie-Bernadette, "The GSM System," France, 1992, pp. 569-577.

(Continued)

*Primary Examiner* — Patrick N Edouard
*Assistant Examiner* — Justin Y Lee
(74) *Attorney, Agent, or Firm* — Zagorin O'Brien Graham LLP

(57) ABSTRACT

A method and system for processing a prepaid call in a mobile telecommunications network wherein charges can be recovered for the call after the SCP and Prepaid Platform lose contact with the MSC or GMSC handling the call. A Trigger Detection Point known as "O-Disconnect" or "T-Disconnect" can be armed in a prepaid subscriber's HLR and can be triggered when the MSC/GMSC loses contact with the SCP. The MSC/GMSC can record the time that the TDP was triggered in memory. The MSC/GMSC can then monitor for call disconnect and record the disconnection time in memory. When the call is disconnected the MSC/GMSC can renew contact with the SCP. MSC/GMSC can identify the call using a unique call identifier and advise the SCP of the times at which contact was lost and the call was disconnected. The SCP can use this information to calculate a charge for the portion of the call that occurred after contact with the MSC/GMSC was lost so that the entire call can be charged in near real-time.

19 Claims, 15 Drawing Sheets

U.S. PATENT DOCUMENTS

| | | | |
|---|---|---|---|
| 5,946,380 | A | 8/1999 | Cohen et al. |
| 5,978,456 | A | 11/1999 | Takeuchi et al. |
| 5,991,407 | A | 11/1999 | Murto |
| 5,991,748 | A | 11/1999 | Taskett |
| 5,995,822 | A | 11/1999 | Smith et al. |
| 6,014,428 | A | 1/2000 | Wolf |
| 6,018,652 | A | 1/2000 | Frager et al. |
| 6,037,880 | A | 3/2000 | Manion |
| 6,058,300 | A | 5/2000 | Hanson |
| 6,061,433 | A | 5/2000 | Polcyn et al. |
| 6,070,067 | A | 5/2000 | Nguyen et al. |
| 6,075,855 | A | 6/2000 | Christiansen et al. |
| 6,115,601 | A | 9/2000 | Ferreira |
| 6,122,510 | A | 9/2000 | Granberg |
| 6,144,847 | A | 11/2000 | Altschul et al. |
| 6,144,938 | A | 11/2000 | Surace et al. |
| 6,157,823 | A | 12/2000 | Fougnies et al. |
| 6,167,251 | A | 12/2000 | Segal et al. |
| 6,169,975 | B1 | 1/2001 | White et al. |
| 6,181,785 | B1 | 1/2001 | Adams et al. |
| 6,185,414 | B1 | 2/2001 | Brunner et al. |
| 6,185,545 | B1 | 2/2001 | Resnick et al. |
| 6,188,752 | B1 | 2/2001 | Lesley |
| 6,195,543 | B1 | 2/2001 | Granberg |
| 6,205,326 | B1 | 3/2001 | Tell et al. |
| 6,236,851 | B1 | 5/2001 | Fougnies et al. |
| 6,240,284 | B1 | 5/2001 | Bugnon et al. |
| 6,253,072 | B1 | 6/2001 | Verdonk |
| 6,256,504 | B1 | 7/2001 | Tell et al. |
| 6,327,363 | B1 | 12/2001 | Henderson et al. |
| 6,333,976 | B2 | 12/2001 | Lesley |
| 6,345,181 | B1 | 2/2002 | Janhonen et al. |
| 6,363,411 | B1 | 3/2002 | Dugan et al. |
| 6,373,930 | B1 | 4/2002 | McConnell et al. |
| 6,377,938 | B1 | 4/2002 | Block et al. |
| 6,393,269 | B1 | 5/2002 | Hartmaier et al. |
| 6,397,055 | B1 | 5/2002 | McHenry et al. |
| 6,404,869 | B1 | 6/2002 | Henderson et al. |
| 6,404,880 | B1 | 6/2002 | Stevens |
| 6,411,803 | B1 | 6/2002 | Malackowski et al. |
| 6,424,706 | B1 | 7/2002 | Katz et al. |
| 6,424,840 | B1 | 7/2002 | Fitch et al. |
| 6,434,126 | B1 | 8/2002 | Park |
| 6,463,130 | B1 | 10/2002 | Malik |
| 6,480,710 | B1 | 11/2002 | Laybourn et al. |
| 6,487,277 | B2 | 11/2002 | Beyda et al. |
| 6,487,401 | B2 | 11/2002 | Suryanarayana et al. |
| 6,490,450 | B1 | 12/2002 | Batni et al. |
| 6,493,547 | B1 | 12/2002 | Raith |
| 6,496,690 | B1 | 12/2002 | Cobo et al. |
| 6,496,691 | B1 | 12/2002 | Easley et al. |
| 6,507,644 | B1 | 1/2003 | Henderson et al. |
| 6,516,190 | B1 | 2/2003 | Linkola |
| 6,526,273 | B1 | 2/2003 | Link, II et al. |
| 6,542,601 | B1 | 4/2003 | Hernandez et al. |
| 6,567,657 | B1* | 5/2003 | Holly et al. .................. 455/408 |
| 6,594,484 | B1 | 7/2003 | Hitchings, Jr. |
| 6,625,268 | B1* | 9/2003 | Wallenius ............... 379/114.28 |
| 6,625,439 | B2 | 9/2003 | Laybourn et al. |
| 6,628,951 | B1 | 9/2003 | Grohn et al. |
| 6,671,506 | B1 | 12/2003 | Lee |
| 6,671,523 | B1 | 12/2003 | Niepel et al. |
| 6,684,072 | B1 | 1/2004 | Anvekar et al. |
| 6,705,520 | B1 | 3/2004 | Pitroda et al. |
| 6,728,353 | B1 | 4/2004 | Espejo et al. |
| 6,741,687 | B1 | 5/2004 | Coppage |
| 6,748,066 | B1 | 6/2004 | Espejo et al. |
| 6,771,950 | B1 | 8/2004 | Shupe et al. |
| 6,904,035 | B2 | 6/2005 | Requena |
| 6,912,383 | B1 | 6/2005 | Li et al. |
| 6,934,529 | B2 | 8/2005 | Bagoren et al. |
| 6,950,876 | B1 | 9/2005 | Bright et al. |
| 6,957,058 | B2 | 10/2005 | Chan et al. |
| 6,975,852 | B1 | 12/2005 | Sofer et al. |
| 6,987,969 | B1 | 1/2006 | Brunig et al. |
| 7,050,811 | B2 | 5/2006 | Grech et al. |
| 7,088,987 | B1 | 8/2006 | Espejo et al. |
| 7,123,703 | B2 | 10/2006 | Hausmann et al. |
| 7,133,685 | B2 | 11/2006 | Hose et al. |
| 7,184,748 | B2 | 2/2007 | Espejo et al. |
| 7,209,890 | B1 | 4/2007 | Peon et al. |
| 7,215,942 | B1 | 5/2007 | McQuaide, Jr. et al. |
| 7,231,201 | B2 | 6/2007 | Espejo et al. |
| 7,280,645 | B1 | 10/2007 | Allen et al. |
| 7,330,110 | B1 | 2/2008 | Heintzman et al. |
| 7,356,328 | B1 | 4/2008 | Espejo et al. |
| 7,463,889 | B1 | 12/2008 | DiPrima et al. |
| 7,466,806 | B2 | 12/2008 | Espejo et al. |
| 7,480,710 | B1 | 1/2009 | Olson et al. |
| 7,529,538 | B2 | 5/2009 | Espejo et al. |
| 7,539,629 | B1 | 5/2009 | Peon et al. |
| 7,609,682 | B2 | 10/2009 | Ang et al. |
| 7,653,377 | B1 | 1/2010 | Espejo et al. |
| 7,706,792 | B1 | 4/2010 | DiPrima et al. |
| 7,787,860 | B2 | 8/2010 | Espejo et al. |
| 2001/0001321 | A1 | 5/2001 | Resnick et al. |
| 2001/0028705 | A1 | 10/2001 | Adams et al. |
| 2001/0049656 | A1 | 12/2001 | Halkosaari et al. |
| 2002/0029189 | A1 | 3/2002 | Titus et al. |
| 2002/0077829 | A1 | 6/2002 | Brennan et al. |
| 2002/0091572 | A1 | 7/2002 | Anderson et al. |
| 2002/0104090 | A1 | 8/2002 | Stettner |
| 2002/0107007 | A1 | 8/2002 | Gerson |
| 2002/0107738 | A1 | 8/2002 | Beach et al. |
| 2002/0111153 | A1 | 8/2002 | Hartmaier et al. |
| 2002/0115424 | A1 | 8/2002 | Bagoren et al. |
| 2002/0143634 | A1 | 10/2002 | Kumar et al. |
| 2002/0147658 | A1 | 10/2002 | Kwan |
| 2002/0156683 | A1 | 10/2002 | Stoutenburg et al. |
| 2002/0181710 | A1 | 12/2002 | Adam et al. |
| 2002/0193093 | A1 | 12/2002 | Henrikson et al. |
| 2002/0193100 | A1 | 12/2002 | Riffe et al. |
| 2003/0002635 | A1 | 1/2003 | Koch et al. |
| 2003/0026404 | A1 | 2/2003 | Joyce et al. |
| 2003/0037176 | A1 | 2/2003 | Dannehr et al. |
| 2003/0095566 | A1 | 5/2003 | Bunting et al. |
| 2003/0119477 | A1 | 6/2003 | Uppal et al. |
| 2003/0125042 | A1 | 7/2003 | Olrik et al. |
| 2003/0126020 | A1 | 7/2003 | Smith et al. |
| 2003/0143978 | A1 | 7/2003 | Cooper |
| 2003/0157925 | A1 | 8/2003 | Sorber et al. |
| 2003/0158960 | A1 | 8/2003 | Engberg |
| 2004/0048599 | A1 | 3/2004 | Kotaluoto et al. |
| 2004/0063423 | A1 | 4/2004 | Kagay, Jr. |
| 2004/0097229 | A1 | 5/2004 | Muhonen et al. |
| 2004/0103191 | A1 | 5/2004 | Larsson |
| 2004/0132449 | A1 | 7/2004 | Kowarsch |
| 2004/0185828 | A1 | 9/2004 | Engelhart |
| 2004/0202187 | A1 | 10/2004 | Kelly et al. |
| 2004/0228457 | A1 | 11/2004 | Espejo et al. |
| 2005/0009499 | A1 | 1/2005 | Koster |
| 2005/0075106 | A1 | 4/2005 | Jiang |
| 2005/0101292 | A1 | 5/2005 | Fukui |
| 2005/0148319 | A1 | 7/2005 | Himeno |
| 2005/0164707 | A1 | 7/2005 | Batni et al. |
| 2005/0250493 | A1 | 11/2005 | Elkarat et al. |
| 2005/0250501 | A1 | 11/2005 | Mobin et al. |
| 2005/0262355 | A1 | 11/2005 | Banet et al. |
| 2006/0003736 | A1 | 1/2006 | Chan et al. |
| 2006/0003766 | A1 | 1/2006 | Parameswar et al. |
| 2006/0023856 | A1 | 2/2006 | Welton |
| 2006/0058010 | A1 | 3/2006 | Williams et al. |
| 2006/0058049 | A1 | 3/2006 | McLaughlin et al. |
| 2006/0073808 | A1 | 4/2006 | Buchert |
| 2006/0240820 | A1 | 10/2006 | Jiang |
| 2006/0240822 | A1 | 10/2006 | Jiang |
| 2007/0049247 | A1 | 3/2007 | Espejo et al. |
| 2007/0106569 | A1 | 5/2007 | McQuaide et al. |
| 2007/0205263 | A1 | 9/2007 | Peon et al. |
| 2007/0281687 | A1 | 12/2007 | Jiang |
| 2008/0014933 | A1 | 1/2008 | Montz et al. |
| 2008/0096525 | A1 | 4/2008 | Engelhart |
| 2008/0119162 | A1 | 5/2008 | Sivalingam et al. |
| 2008/0207181 | A1 | 8/2008 | Jiang |
| 2008/0261559 | A1* | 10/2008 | Cai et al. .................... 455/406 |
| 2008/0299967 | A1 | 12/2008 | Kazmi |
| 2008/0318545 | A1 | 12/2008 | Kazmi |

| | | | |
|---|---|---|---|
| 2009/0029673 | A1 | 1/2009 | Hamadi et al. |
| 2009/0061815 | A1 | 3/2009 | Myers et al. |
| 2009/0061818 | A1 | 3/2009 | Myers et al. |
| 2009/0061856 | A1 | 3/2009 | Kazmi et al. |
| 2009/0061857 | A1 | 3/2009 | Kazmi |
| 2009/0061868 | A1 | 3/2009 | Kazmi |
| 2009/0234747 | A1 | 9/2009 | Peon et al. |
| 2010/0105369 | A1 | 4/2010 | Diprima et al. |

FOREIGN PATENT DOCUMENTS

| | | |
|---|---|---|
| EP | 1039764 | 9/2000 |
| EP | 1372089 | 12/2003 |
| WO | 9216078 | 9/1992 |
| WO | 9821874 | 5/1998 |
| WO | 9918713 | 4/1999 |
| WO | 0025507 | 5/2000 |
| WO | 0019702 | 6/2000 |

OTHER PUBLICATIONS

Zahid Ghadialy, "CAMEL: An Introduction," printed from http://www.3g4g.co.uk/Tutorial/ZG/zg_camel.html, dated Jul. 25, 2004, 11 pages.

David A. Smith, "An Introduction to GSM Enhancements for Operator Specific Services (CAMEL)," The Institution of Electrical Engineers, 1996, 9 pages.

Paulius Meskauskas, "Customised Applications for Mobile Enhanced Logic (CAMEL)," Research Seminar on Nomadic Computing, 13 pages.

International Search Report and Written Opinion, mailed Feb. 9, 2009 for App. No. PCT/US2008/056385, 8 pages.

U.S. Appl. No. 11/754,808, filed May 29, 2007, titled, "Optimized CAMEL Triggering for Prepaid Calling," naming inventor Mustafa Anwar Kazmi.

U.S. Appl. No. 11/765,655, filed Jun. 20, 2007, titled, "Conditional Call Treatment for Prepaid Calls," naming inventor Mustafa Anwar Kazmi.

U.S. Appl. No. 11/781,459, filed Jul. 23, 2007, titled, "Dynamic Location-Based Rating for Prepaid Calls," naming inventor Charles Hamadi and Mustafa Anwar Kazmi.

U.S. Appl. No. 11/846,277, filed Aug. 28, 2007, titled, "Decisionmaking for Dynamic Local Time Updates in a Prepaid Terminating Call," naming inventor Mustafa Anwar Kazmi.

U.S. Appl. No. 11/846,259, filed Aug. 28, 2007, titled, "Peak Off-Peak Rating for Prepaid Terminating Calls," naming inventor Mustafa Anwar Kazmi.

U.S. Appl. No. 11/846,299, filed Aug. 28, 2007, titled, "Determining Capability to Provide Dynamic Local Time Updates in a Prepaid Terminating Call," naming inventor Mustafa Anwar Kazmi.

3GPP TS 02.78 v7.2.0 (Dec. 2001) Technical Specification, "3rd Generation Partnership Project; Technical Specification Group Services and System Aspects; (CAMEL); Service definition—State 1 (Release 1998), " GSM® Global System for Mobile Communications, 34 pages.

Crowe, David, "Thirsty for new features? Get a CAMEL?", Cellular Networking Perspectives, David Crowe's Wireless Review Magazine Articles Protocols Section: Mar. 2001, 5 pages, retrieved Nov. 17, 2004 from URL: http://www.cnp-wireless.com/ArticleArchive/Wireless%20Review/200103%20CAMEL.html.

ITU-T Recommendation Q.762, "Signalling System No. 7—ISDN User Part general functions of messages and signals," International Telecommunications Union, Dec. 1999, 30 pages, URL: <https://staff.hti.bfh.ch/mdm1/Kursunterlagen/SS7/T-REC-Q.762.pdf>.

ITU-T Recommendation Q.763, "Signalling System No. 7—ISDN User Part formats and codes," International Telecommunications Union, Dec. 1999, 134 pages, URL: <https://staff.hti.bfh.ch/mdm1/Kursunterlagen/SS7/T-REC-Q.763.pdf>.

Kislak, Ali, "'CAMEL,' 'Customised Applications for Mobile network Enhanced Logic,'" CAMEL & IN, Demo Version 1.0, Jan. 19, 2002, 18 pages, retrieved Nov. 17, 2004 from URL: http://www.hotel-fiesta.com/4g-aliweb/MyDOCS/CAMELMExEin/CAMELin.htm.

Zahid Ghadialy, "CAMEL: An Introduction," printed from http://www.3g4g.co.uk/Tutorial/ZG/zg_camel.html, dated Jul. 25, 2004, 11 pages.

David A. Smith, "An Introduction to GSM Enhancements for Operator Specific Services (CAMEL)," The Institution of Electrical Engineers, 1996, 9 pages.

3rd Generation Partnership Project; Technical Specification Group Core Network; Customised Applications for Mobile Network Enhanced Logic (CAMEL) Phase 4; CAMEL Application Part (CAP) specification (Release 5), 3GPP TS 29.078 5.0.0 (Jun. 2006), 222 pages.

Cloward, William H., "Sophisticated, High Speech Capacity Voice Response Application for End Users," Official Proceedings of Speech Tech '86, Media Dimensions, Inc., Apr. 30, 1986, pp. 58/61.

Gadget, Joe, "Purchase Coca Cola Using Your Cellphone in Japan," http://http://www.techfresh.net/gadgets/misc-gadgets/purchase-coca-cola-using-cellphone-in-japan/, Sep. 29, 2006, 5 pages.

Levy, Ira D., "Keeping the bells ringing: Account replenishment in near real time", TMA Journal, v19n2, p. 24-26, Mar./Apr. 1999.

Moshavi, Sharon, "Please Deposit No Cents," Forbes, Aug. 16, 1993, 1 page.

How does PayPal Auto-Recharge Work?, Skype Help, http://support.skype.com/index.php?_a=knowledgebase&_j=questiondetails&_i=1044, printed Aug. 28, 2007, 1 page.

What is Auto credit and how do I use it?, Skype Help, http://support.skype.com/index.php?_a=knowledgebase&_j=questiondetails&_i=633, printed Aug. 28, 2007, 1 page.

Meskauskas, Paulius, "Customised Applications for Mobile Enhanced Logic (CAMEL)," Research Seminar on Nomadic Computing, University of Helsinki, 1999, 13 pages.

* cited by examiner

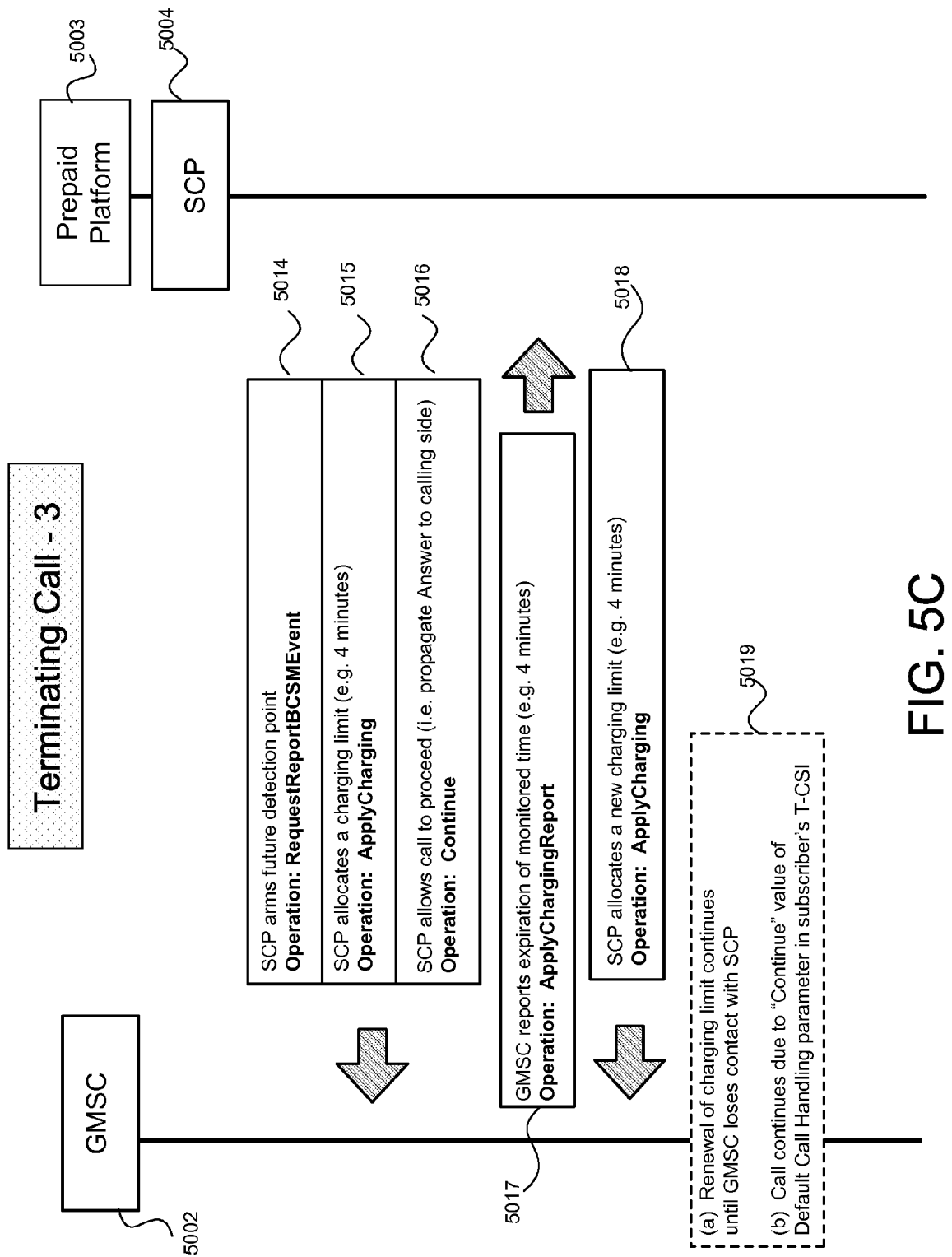

RECOVERY OF LOST REVENUE IN PREPAID CALLS

FIELD OF ART

Aspects and features described herein relate to use of CAMEL triggers in a mobile communications system to provide a method and system to enable charging for a prepaid call even if the SCP loses contact with the MSC or GMSC at some point during the call.

BACKGROUND

The use of mobile communications devices has become commonplace in today's society. As consumers of mobile communications services become more sophisticated, it becomes more important for service providers to offer more and better services in order to fully meet their subscribers' needs. Such value-added services have become an integral part of the consumer's expectations regarding their mobile communications service.

Many of these value-added services relate to the provision of Intelligent Network (IN) services such as video or music download services, automated call forwarding services, ring-back tone services, prepaid services and the like. In the Global System for Mobile Communications (GSM), the Customized Application of Mobile Enhanced Logic (CAMEL) standard has been developed to aid GSM operators to offer operator-specific services to their subscribers, even if a subscriber is roaming outside their home network. These services can include call processing functions such as caller ID and call screening, call forwarding, call rerouting; charging functions such as location-based charging or personal discounts; and provision of tones and announcements to provide information regarding a call to a subscriber's mobile telephone.

CAMEL protocol is defined in a set of standards established by the ETSI (European Telecommunication Standardization Institute) and later upgraded as part of 3GPP (Third Generation Partnership Project) initiative. These standards can be found on the World Wide Web at http://webapp.etsi.org/key/queryform.asp. Additional information regarding CAMEL networks can be found in many publications. The most comprehensive work on CAMEL including the latest standardization enhancements can be found in the book by Rogier Noldus entitled, *CAMEL, Intelligent Network for the GSM, GPRS and UMTS Networks*, published by John, Wiley & Sons Limited (2006). Other publications that describe the architecture and operation of a mobile network using CAMEL functionality include "Customised Applications for Mobile Enhanced Logic (CAMEL)," by Paulius Meskauskas for the Research Seminar on Nomadic Computing for the Department of Computer Science at the University of Helsinki; the CAMEL tutorial by Zahid Ghadialy entitled "CAMEL: An Introduction," (Jul. 25, 2004), available on the World Wide Web at http://www.3g4g.co.uk/Tutorial/ZG/zg_camel.html; and "An Introduction to GSM Enhancements for Operator Specific Services (CAMEL)" (1996) by David G. Smith, published by the IEEE, Savoy Place, London. Information regarding CAMEL triggers and trigger detection points may also be found in U.S. Patent documents such as, for example, U.S. Pat. No. 7,050,811 to Grech et al. and U.S. Patent Application Publication No. 2003/0095566 to Bunting et al.

Information regarding CAMEL networks may also be found in U.S. patent application Ser. No. 11/754,808 entitled "Optimized Camel Triggering for Prepaid Calling," filed May 29, 2007; U.S. patent application Ser. No. 11/765,655 entitled "Conditional Call Treatment For Prepaid Calls," filed Jun. 20, 2007; and U.S. patent application Ser. No. 11/781,459 filed Jul. 23, 2007; U.S. patent application Ser. No. 11/846,259 entitled "Peak Off-Peak Rating for Prepaid Terminating Calls," filed Aug. 28, 2007; U.S. patent application Ser. No. 11/846,277 entitled "Decisionmaking for Dynamic Local Time Updates in a Prepaid Terminating Call," filed Aug. 28, 2007; and U.S. patent application Ser. No. 11/846,299 entitled "Determining Capability to Provide Dynamic Local Time Updates in a Prepaid Terminating Call," filed Aug. 28, 2007, each of which shares at least one common inventor with the present application and each of which is hereby expressly incorporated by reference herein in its entirety.

Processing of a call in a CAMEL network can be accomplished by means of signaling between one or more of a subscriber's Home Location Register (HLR), a visiting Location Register (VLR) associated with the Mobile Switching Center (MSC) where the mobile subscriber is currently located, a Gateway Mobile Switching Center (GMSC), and a Service Control Point (SCP). CAMEL works to enable the provision of enhanced mobile services by providing CAMEL Application Part (CAP) messages, for communication between an SCP and an MSC handling an outgoing call or a GMSC handling an incoming call.

CAMEL also provides a Basic Call State Model (BCSM), which describes the different phases of call processing in the MSC. An Originating Basic Call State Model (O-BCSM) describes the call processing for a mobile-originated call, i.e., a call where the calling party is originating a call from her mobile device. Similarly, a Terminating Basic Call State Model (T-BCSM) describes the call processing to route a terminating call to the mobile subscriber as a recipient of an incoming call. Both the O-BCSM and T-BCSM contain various points in the call processing between the MSC and the SCP. Each state is preceded by a transition step, or Detection Point (DP) where the call is handed over to the SCP for a determination whether the call can proceed to the next state.

Control of a call in a CAMEL network can be managed by the SCP and the MSC or GMSC through the use of DPs (both TDPs and EDPs) and CAP operations. A CAP operation message from the SCP to the MSC can contain instructions regarding the handling of the call at that point or from that point onward. For example, Operation: RequestReportBCS-MEvent is used to arm future DPs which contain instructions for future processing. CAP operations also are used to send messages between the MSC and the SCP regarding a status of the call. For example, an operation such as Operation: EventReportBCSMEvent can be used by the MSC to report to the SCP that the call has been answered.

One of the services provided in a CAMEL network is prepaid mobile service, both for mobile originators and mobile recipients of calls in the mobile system. Prepaid mobile service is a popular option for many users. It can enable a user to enjoy the benefits of mobile communications without having to enter into a long-term contract. Prepaid mobile service also can be useful to facilitate management of mobile service. For example, prepaid service can be used to as a parental control tool to manage a child's use of mobile telecommunications services. Prepaid service also can be used by businesses as a management tool to monitor and control corporate use of mobile resources.

Charging for a prepaid call in a CAMEL network is handled by the SCP based in part on CAP messages from the MSC. If CAP messaging between the MSC and the SCP fails, but the call continues due to the subscriber's default call handling instructions, the SCP cannot easily charge the subscriber's prepaid account for the portion of the call occurring after contact with the MSC is lost.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter.

Aspects and features described herein relate to a method and system to allow the SCP to charge for a call in a CAMEL network after messaging between the MSC and the SCP fails and the SCP loses control of the call. New Trigger Detection Points (TDPs) are provided, known as O-Disconnect for an originating call, and T-Disconnect for a terminating call. A prepaid mobile subscriber in a CAMEL network can have a Default Call Treatment parameter in her CAMEL profile which controls whether a call will terminate or continue if messaging between the MSC and the SCP fails. If the subscriber's Default Call Treatment parameter instructs that the call should continue, the MSC (or GMSC in the case of a terminating call) can arm the O-Disconnect (or T-Disconnect) TDP for that call, which will instruct the MSC to monitor for disconnection of the call. In addition, the MSC/GMSC can store information regarding the local time at which the O-Disconnect or T-Disconnect TDP is armed in a memory in the MSC/GMSC. When the call is disconnected, the MSC/GMSC can send a new CAMEL Operation: InitialDetectionPoint to the SCP to open a new CAMEL dialogue with the SCP. As part of this Operation, the MSC/GMSC can identify the call by such parameters as "GSM Call Reference Number" and can advise the SCP of both the local time at which the call was continued pursuant to the subscriber's Default Call Treatment instructions and the local time when the call was disconnected. In this way, the SCP can relate the information provided in the Operation: IDP with the original call, before CAP messaging was interrupted, and can calculate any additional charges due for the call.

BRIEF DESCRIPTION OF THE DRAWINGS

FIGS. 5A-5D depict an exemplary embodiment of a call flow in a CAMEL Terminating Basic Call State Model in a mobile network according to one or more aspects described herein.

DETAILED DESCRIPTION

The aspects and features summarized above can be embodied in various forms. The following description shows, by way of illustration, combinations and configurations in which the aspects can be practiced. It should be understood that the described aspects and/or embodiments are merely examples and that other aspects and/or embodiments can be utilized. It should further be understood that structural and functional modifications of the aspects, features, and embodiments described herein can be made without departing from the scope of the present disclosure. In addition, although the aspects and features herein are described in the context of embodiments in a CAMEL network utilizing a particular Basic Call State Model and are described using particular nomenclature for the steps and operations therein, it should be noted that variations in call state configurations and protocols may be used to process prepaid mobile calls in a CAMEL network and that such variations in configuration and protocol are within the scope of the present disclosure.

For example, although aspects herein are described in the context of processing a prepaid call in a mobile network using CAMEL processing, it should be noted that recovery of potentially lost revenue in the case where communication between control points fails can be utilized in other telecommunications systems using a plurality of control points to control processing of calls in the network, and can be applied not only to prepaid subscribers but to any other subscribers in the network.

Figure 1:
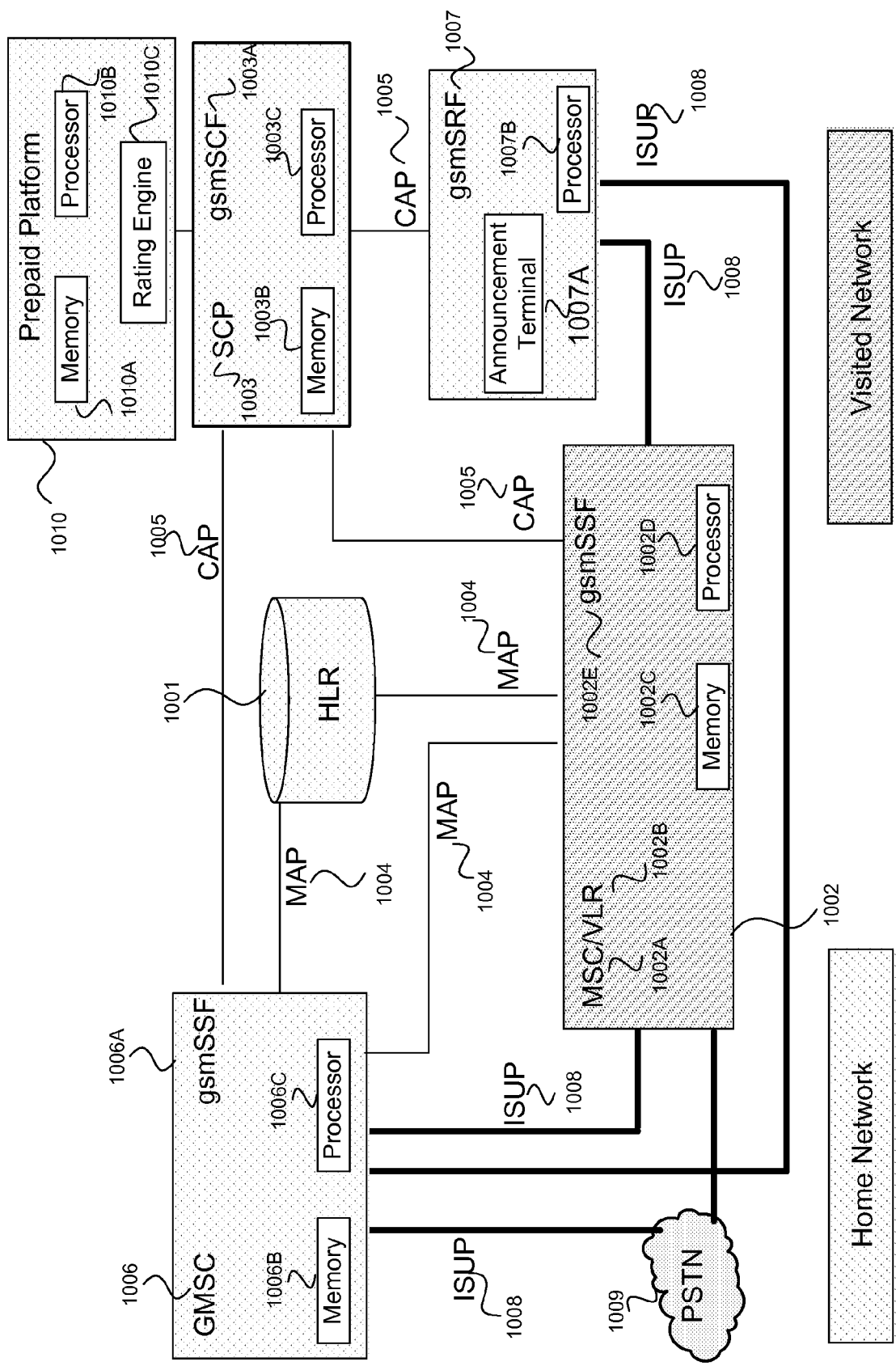
FIG. 1 is a block diagram depicting network elements in a CAMEL network.

FIG. 1 depicts exemplary network elements that can be utilized in a CAMEL network in accordance with one or more aspects herein. Signaling for call set up and call tear-down between network elements shown in FIG. 1 can be accomplished using ISDN User Part (ISUP) 1008, which is a part of the Signaling System #7 (SS7) communications protocol for signaling originating and terminating switching locations of telephone calls in a Public Switched Telephone Network (PSTN) 1009.

As shown in the configuration depicted in FIG. 1, a CAMEL network can include a Home Location Register (HLR) 1001, which can hold the CAMEL Subscription Information (CSI) for each subscriber in the CAMEL network. The CSI for a subscriber can include subscription information regarding call processing and call feature enhancements. The set of information provisioned in the HLR for the control of a mobile originating call is known as O-CSI. This includes the set of TDP that can intercept the processing of an originating call and also includes a set of parameters to control the actions at each of those TDPs. In a similar manner, the set of information provisioned in the HLR for the control of a terminating call to a mobile subscriber as recipient of the call is known as "T-CSI." The T-CSI for a terminating mobile subscriber can include the set of TDPs that can intercept the processing of a terminating call towards that subscriber and a set of parameters to control the actions at each of those TDPs.

The exemplary CAMEL network shown in FIG. 1 also can include a Mobile Switching Center/Visiting Location Register (MSCNVLR) 1002. The MSCNVLR 1002 can include a Mobile Switching Center (MSC) 1002A, memory 1002C, and processor 1002D that can receive and process a mobile subscriber's request to make a call, and a database of roaming mobile subscribers within the MSC's service area, which can be known as a Visiting Location Register (VLR) 1002B. When a mobile subscriber enters an area served by MSC 1002A, the subscriber's location can be updated in the HLR to point to VLR 1002B. During such an update, VLR 1002B also can be updated via Mobile Application Part (MAP) 1004 to include the subscriber's Originating CAMEL Subscription Information (O-CSI) from HLR 1001. MSC 1002A can then use the visiting mobile subscriber's O-CSI to govern processing of an outgoing mobile call originated by the subscriber. The exemplary CAMEL network shown in FIG. 1 can also include Service Control Point (SCP) 1003, which can include a memory 1003B and a processor 1003C. In accordance with aspects herein, the address for the SCP in a subscriber's home network can be part of the subscriber's O-CSI obtained during an update of the VLR. During outgoing call setup for a mobile subscriber, MSC\VLR 1002 can contact SCP 1003 using GSM Service Switching Function (gsmSSF) 1002E by way of CAMEL Application Part (CAP) protocol 1005, to inform SCP 1003 that the caller is a CAMEL subscriber and that the call should be processed by Service Control Function gsmSCF 1003A.

The exemplary CAMEL network shown in FIG. 1 also depicts network elements that can be used to process an incoming (terminating) call to a CAMEL mobile subscriber. When a call is made to a mobile user in the network, the call can be received by a Gateway Mobile Switching Center 1006, which also includes GSM Service Switching Function (gsmSSF) 1006A, memory 1006B, and processor 1006C. As shown in FIG. 1, when an incoming call directed to a mobile subscriber in a CAMEL network is received, GMSC 1006 can fetch the Terminating CAMEL Subscription Information (T-CSI) from that mobile subscriber's HLR 1001 via Mobile Application Part (MAP) 1004. Once the T-CSI is received from the HLR 1001, in a similar manner as for an outgoing call, GMSC 1006 can contact Service Control Point (SCP) 1003 using gsmSSF 1006A within GMSC 1006 by way of CAMEL Application Part (CAP) protocol 1005 to inform the SCP that the caller is a CAMEL subscriber and that the call should be processed by Service Control Function gsmSCF 1003A.

Among the functions performed by SCP 1003 is managing and calculating charges incurred by a prepaid subscriber for outgoing and incoming calls. SCP 1003 can obtain information regarding a prepaid mobile subscriber from Prepaid Platform 1010. According to aspects herein, memory 110A in Prepaid Platform 1010 can contain information regarding a prepaid mobile subscriber's prepaid account, for example, account balance, call charging history, and special rate information, if any. Processor 1010B in Prepaid Platform 1010 can calculate a prepaid subscriber's account balance and available funds, determine whether a prepaid subscriber has sufficient funds or is otherwise eligible to complete an outgoing or incoming call, and communicate this information to SCP 1003 for use in controlling the prepaid call.

FIG. 1 also depicts Specialized Resource Function gsmSRF 1007, which may contain an Announcement Terminal 1007A, as an element of a CAMEL network. The SCP 1003 can instruct the MSC/VLR or GMSC via CAMEL Operation: Establish Temporary Connection to set up a speech path to gsmSRF 1007. The gsmSRF, in turn, can contact SCP 1003 via CAP 1005 and can receive messages from SCP 1003 via CAP 1005 which can enable gsmSRF 1007 to play one or more messages to a caller by means of Announcement Terminal 1007A. For example, if processor 1010B in Prepaid Platform 1010 determines that a subscriber's prepaid account balance has fallen below a predetermined limit, Prepaid Platform 1010 can instruct SCP 1003 to cause Announcement Device 1007A to play a message informing the caller that the balance in the subscriber's prepaid account is insufficient to permit the call to be completed. Alternatively, when a charge to the prepaid subscriber's account has been made, for example in accordance with aspects and features herein, SCP 1003 can instruct Announcement Device 1007A to play a message informing the subscriber that a charge has been made.

A subscriber's HLR profile can be "armed" with various CAMEL Trigger Detection Points (TDPs). These TDPs can be predefined in a CAMEL network and can form part of the subscriber's CAMEL subscription profile in the HLR. In a CAMEL network, a detection point (DP) can be described as being "armed" if it has been activated and is available for use in processing the call. Exemplary detection points include DP2-Collected Information, which can be used as an initial DP in a mobile originating call, and DP12-Terminating Attempt Authorized, which can be used as an initial DP in a mobile terminating call. In accordance with one or more aspects and features described herein, there also can be provided two additional TDPs in the subscriber's HLR, O-Disconnect and T-Disconnect. In accordance with aspects and features described in more detail below, the O-Disconnect and the T-Disconnect TDPs can be triggered if the MSC/GMSC loses contact with the SCP at some point during the call and can enable the SCP and the Prepaid Platform to charge for the entire duration of the prepaid call, even after the SCP has lost control of the call due to a communications failure or otherwise. This can be accomplished by attaching, in the HLR, a "triggering criterion" with both O-Disconnect and T-Disconnect so that those DP's will be armed only if the call is subject to Default handling value of Continue.

The subscriber's HLR also can contain a parameter known as "Default Call Handling," which can control the handling of a call if the logical relationship between the MSC and the SCP established for the control of that call instance (also known as Camel Dialogue) fails. Such dialogue failure can happen due to a loss of physical communication between the MSC and the SCP, for example, due to any error situation in the messaging using CAP protocol or otherwise. The value of the Default Call Handling parameter can determine the action to be taken in the call upon a failure of the CAMEL dialogue between the MSC and the SCP. For example, the Default Call Handling can be set to "release" so that if there is a problem in the CAMEL dialogue, the call will be released, i.e., terminated. Alternatively, the Default Call Handling can be set to "continue," so that the call can continue even if messaging between the MSC and the SCP is interrupted.

If a prepaid call processed in accordance with conventional CAMEL methods continues, the SCP cannot control charging for the prepaid call after the point where dialogue with the MSC fails. In such a case, it can be difficult to recover charges for the call incurred after that point. A loss of revenue can be detected only after the call ends by comparing the Call Detail Record in the MSC with the Call Detail Record in the SCP and charging the prepaid subscriber at a later time. However, such late charging could lead to customer dissatisfaction, since the customer would not become aware of such additional charges being made to her account in real time but at a later time, perhaps after she has attempted to make additional calls on her prepaid account. For this reason, it is not customary to recover charges incurred in a prepaid call after the SCP loses contact with the MSC, thus leading to a loss of revenue for the prepaid telecommunications provider.

In accordance with aspects and features described herein and in more detail below with reference to FIGS. 4A-4D and 5A-5D, there is provided a method and system for continuing to charge a prepaid call in real time even after messaging between the MSC and the SCP fails and the SCP can no longer control charging for the call. According to an embodiment of a method and system described herein, the MSC can advise the SCP of the time at which the SCP loses control of the call and the time at which the call is disconnected by the parties. Using this information and information regarding an identity of the call, the SCP can calculate the time for which charging is needed and can charge the prepaid mobile subscriber's account, thus reducing the amount of revenue lost from calls having a failure of the CAMEL dialogue.

Figure 2A:
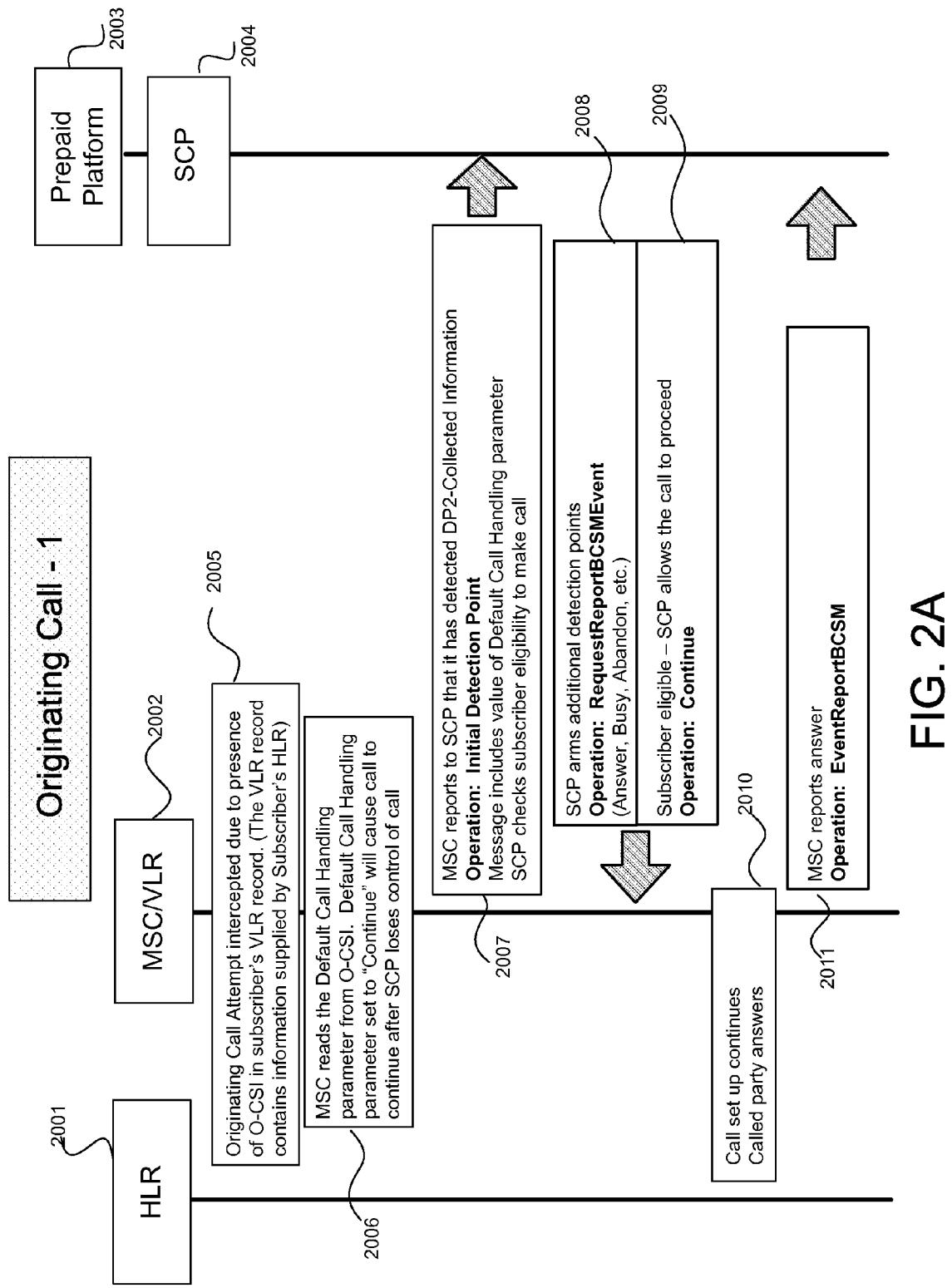
FIGS. 2A-2C depict a call flow in a CAMEL Originating Basic Call State Model in a mobile network in accordance with conventional methods.
Figure 2B:
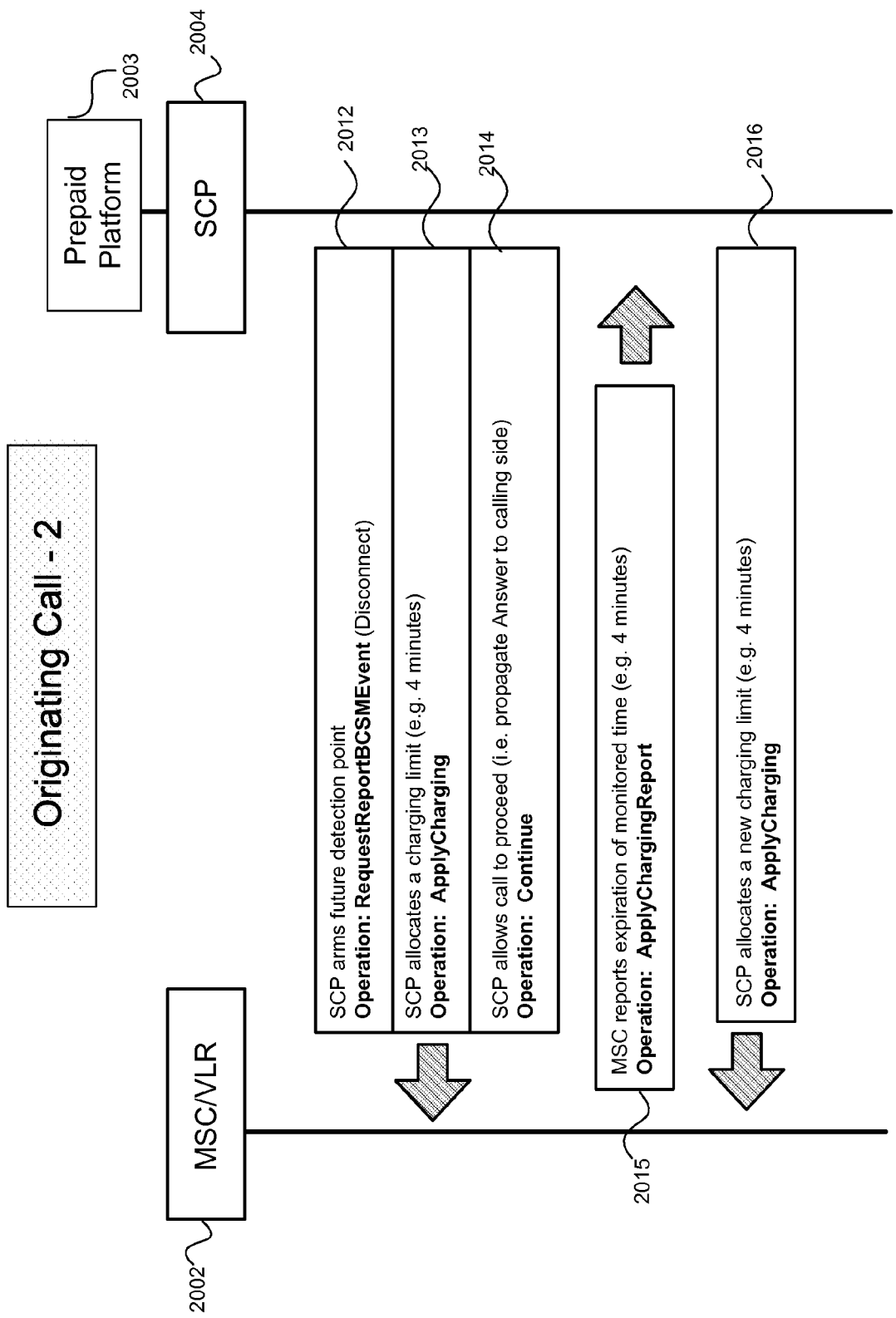
Figure 2C:
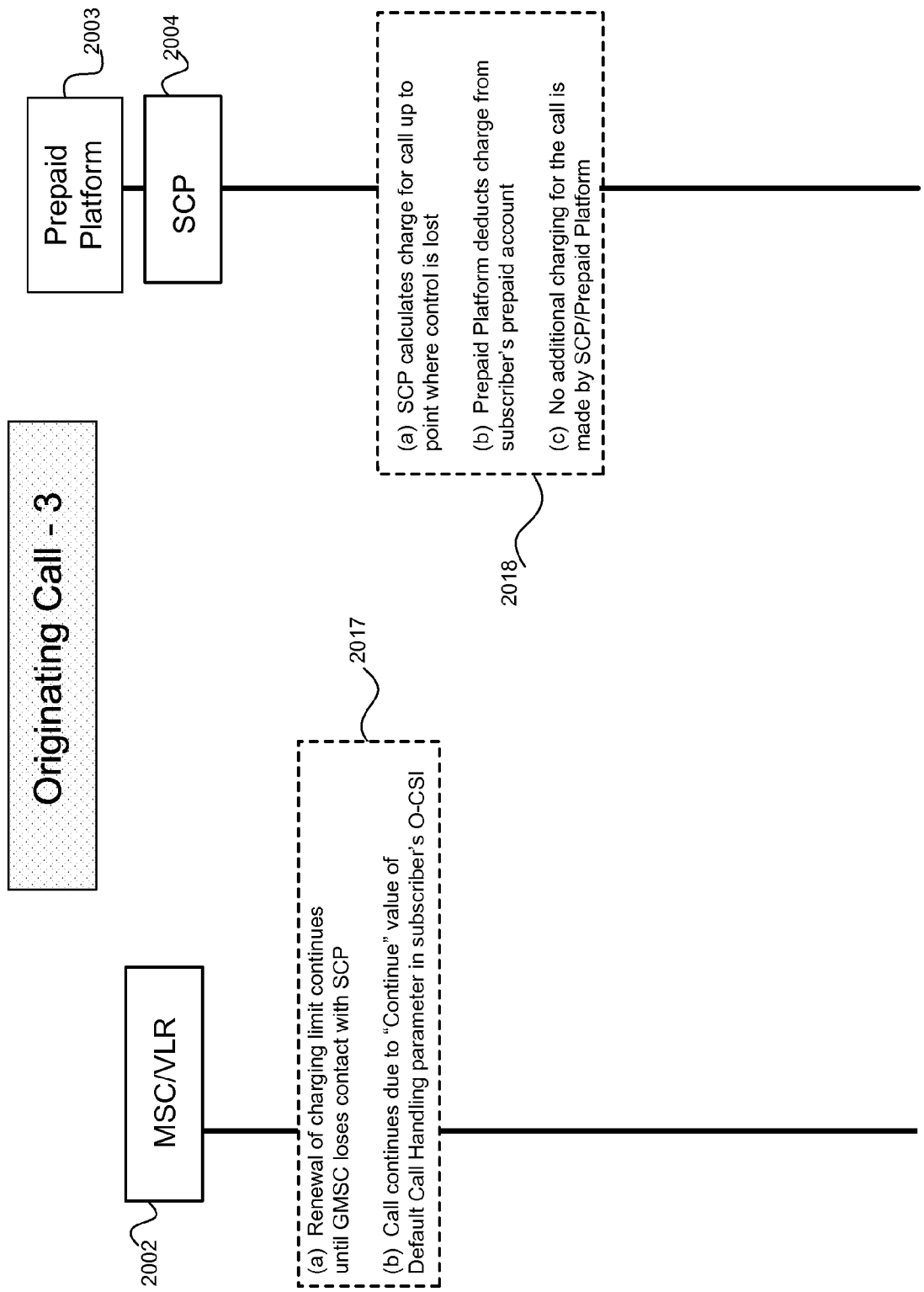

FIGS. 2A-2C depict a conventional call flow for an originating call in a CAMEL network where the call continues after communication between the MSC and the SCP fails. As shown in FIGS. 2A-2C, the call processing involves an information flow between HLR 2001, MSC 2002, Prepaid Platform 2003, and SCP 2004.

As shown in FIG. 2A, at step 2005 a prepaid subscriber's outgoing (originating) call is intercepted due to the presence of Originating CAMEL Subscription Information (O-CSI) in the subscriber's record in the VLR. At step 2006, the MSC reads the value of the Default Call Handling parameter from the subscriber's O-CSI so that MSC 2002 can control the call according its value if the CAMEL dialogue between MSC 2002 and SCP 2004 fails. For example, a "continue" value of the Default Call Handling parameter will cause the call to continue after failure of the CAMEL dialogue, whereas a "release" value will cause the call to terminate. For purposes of the present disclosure, the value of the Default Call Handling parameter will always be assumed to be set to "continue."

At step 2007, by means of CAP Operation: InitialDectionPoint, MSC 2002 reports to SCP 2004 that it has detected a first TDP for the call, DP-2 Collected Information. As part of the processing, MSC 2002 flags the "continue" value of the Default Call Handling parameter, and thus if the CAMEL dialogue between the MSC and the SCP fails, the call will continue. At this point in the call, SCP 2004 also checks the eligibility of the prepaid subscriber to make the call, for example, checks the amount in the subscriber's prepaid account to see if the subscriber has sufficient funds to cover the call. At step 2008, via Operation: RequestReportBCSMEvent SCP 2004 arms additional detection points for events at this point in the call, such as Answer, Busy, Abandon, etc., and instructs MSC 2002 to monitor for these events. At step 2009, SCP 2004 confirms that the prepaid subscriber is eligible to make the call and allows the call to proceed via Operation: Continue. At step 2010, the call setup continues and the called party answers, and at step 2011 MSC 2002 reports to SCP 2004 via Operation: EventReportBCSM that the call has been answered.

FIG. 2B depicts additional originating call processing in accordance with conventional methods after the prepaid call has been answered. As shown in FIG. 2B, after the call has been answered, at steps 2012 through 2014, SCP 2004 sends several instructions to MSC 2002 regarding charging and monitoring of the call. At step 2012, SCP 2004 arms one or more future detection points in the call, for example, an Event Detection Point (EDP) for call disconnect, by sending Operation: RequestReportBCSMEvent to MSC 2002.

In addition, to ensure that a prepaid subscriber making an outgoing call does not exceed her prepaid account balance or otherwise become ineligible to continue the call, messaging between MSC 2002 and SCP 2004 control call flow in segments so that the prepaid subscriber's eligibility to continue the call can be monitored. At step 2013 via Operation: Apply Charging SCP 2004 allocates a first charging limit time period, for example, 4 minutes, to the prepaid call, advises MSC 2002 of this charging limit time period, and instructs MSC 2002 to monitor for its expiration. At step 2014, SCP 2004 allows the call to proceed by instructing MSC 2002 via Operation: Continue to propagate the answer to the calling party side. At step 2015, after the expiration of the initial 4-minute charging limit time period, MSC 2002 reports to SCP 2004 via Operation: ApplyChargingReport that the monitored time has expired. If the caller's prepaid account balance is sufficiently high to cover an additional period or the prepaid subscriber is otherwise eligible to continue the call, at step 2016, SCP 2004 allocates an additional new charging limit time period, for example, another 4 minutes, and via a second iteration of Operation: ApplyCharging advises MSC 2002 of this new charging limit period.

As seen in FIG. 2C, in step 2017(*a*), the allocation, monitoring, and renewal of charging limits seen in steps 2013, 2015, and 2016 of FIG. 2B continues until MSC 2002 loses contact with SCP 2004. It should be noted that the communication between MSC 2002 and SCP 2004 can be lost at any time during the call, even before the first allocated charging limit time period has expired. When such failure of communication between MSC 2002 and SCP 2004 occurs, the call will be processed according to the value of the Default Call Handling parameter reported in the Operation: InitialDetectionPoint at step 2007. Thus, because in this case the value of the Default Call Handling parameter is set to "continue," the call will continue, even if SCP 2004 no longer can control charging for the call.

As seen in step 2018, in a conventional CAMEL network, because SCP 2004 loses control of the call when the CAMEL dialogue fails, SCP 2004 cannot know what additional minutes are being used by the prepaid subscriber and cannot charge for that additional time, but instead can charge for the call only up to that point. Thus, as seen in step 2018(*a*), after a failure of communication between MSC 2002 and SCP 2004, SCP 2004 and Prepaid Platform 2003 calculate the charge due for the call up to the point when the last ApplyChargingReport was received by SCP 2004 before control of the call was lost, and at step 2018(*b*), Prepaid Platform 2003 deducts this amount from the subscriber's prepaid account. As noted above, because of problems with customer dissatisfaction from delayed charging, as seen in step 2018(*c*), in conventional telecommunications networks, in a call processed according to conventional CAMEL protocol, no additional charging is made by the SCP or the Prepaid Platform for the call. Thus, in a conventional CAMEL network, any charges for additional time that the call continues are not recovered, resulting in lost revenue to the network.

Figure 3A:
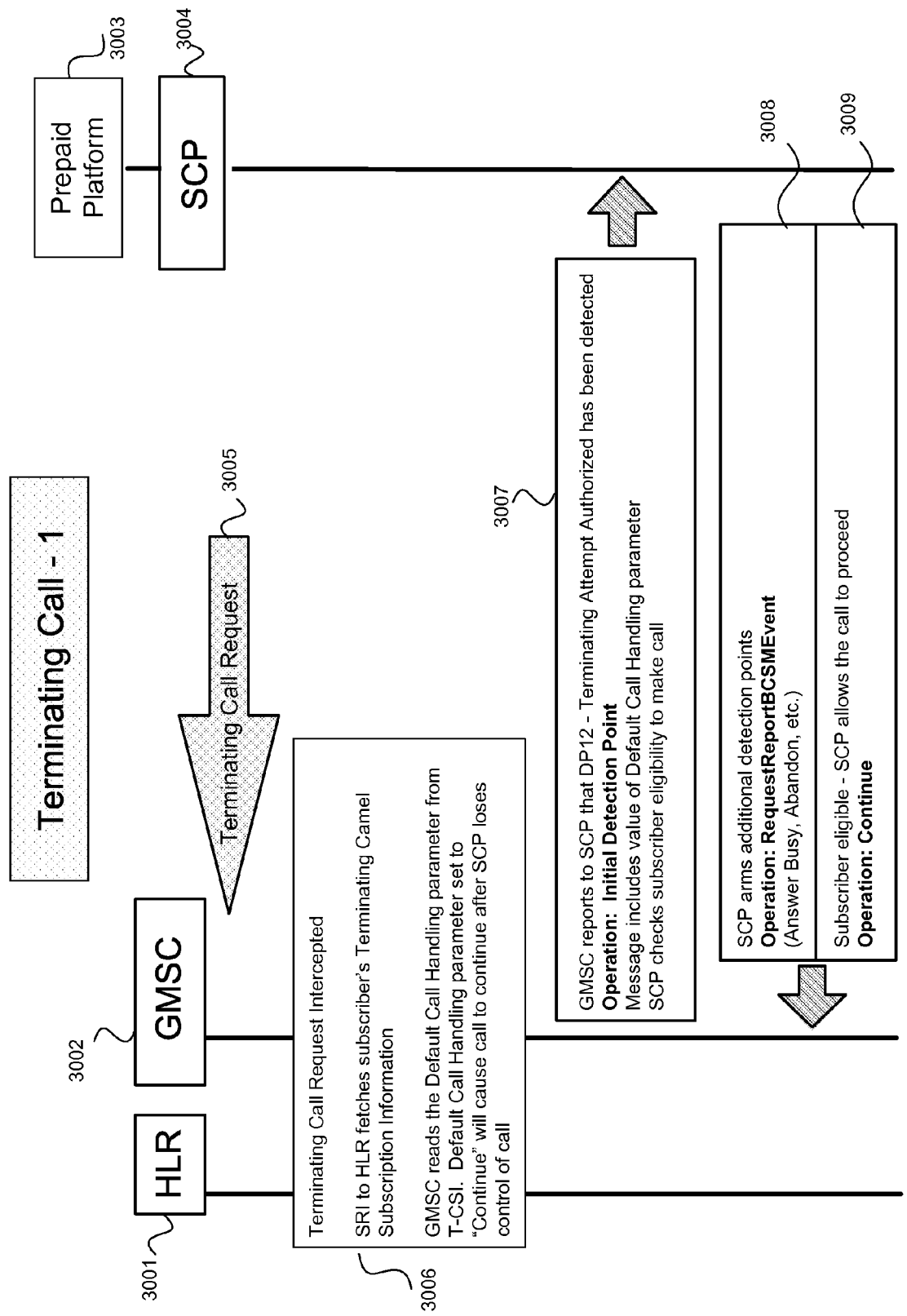
FIGS. 3A-3C depict a call flow in a CAMEL Terminating Basic Call State Model in a mobile network in accordance with conventional methods.
Figure 3B:
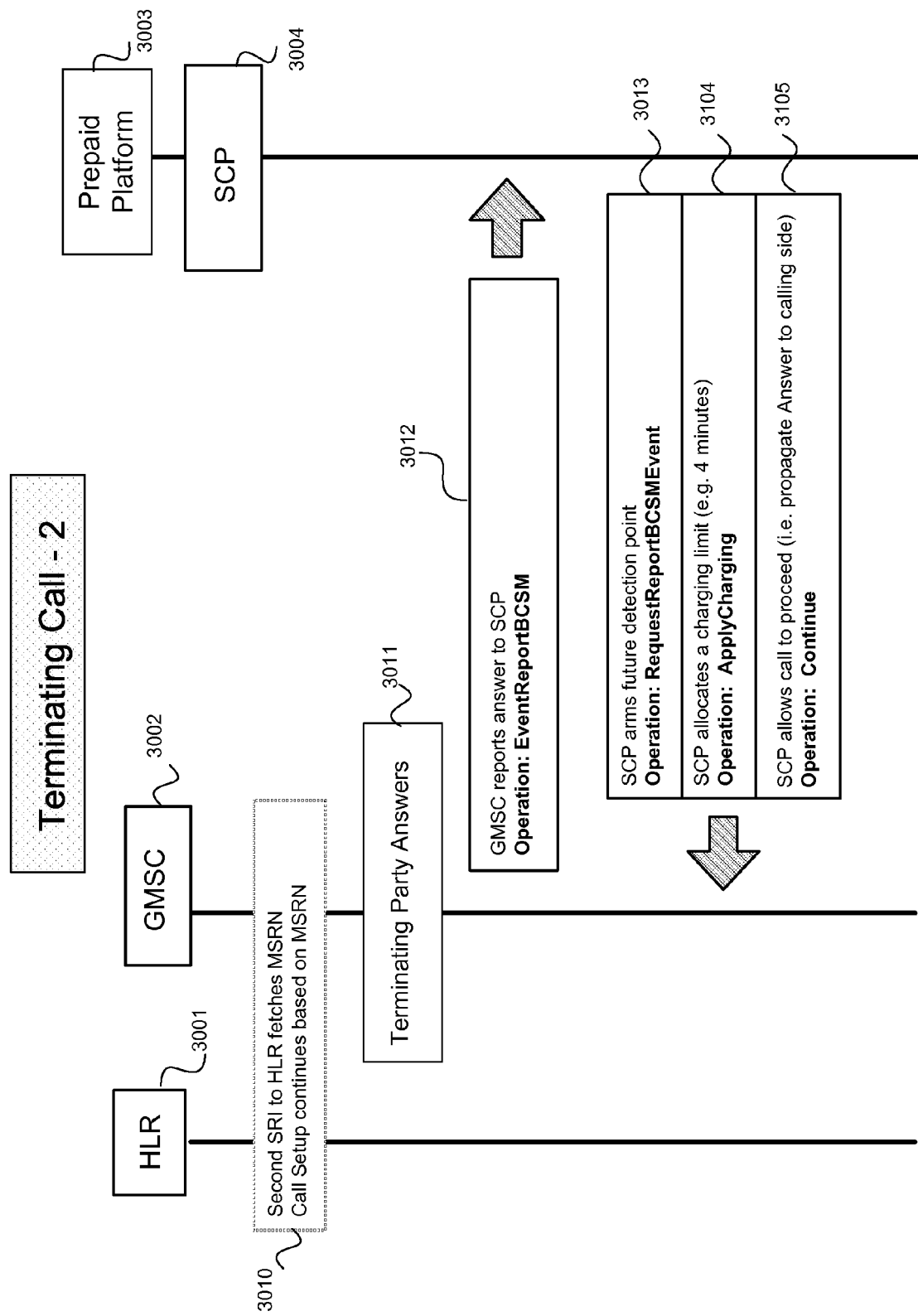
Figure 3C:
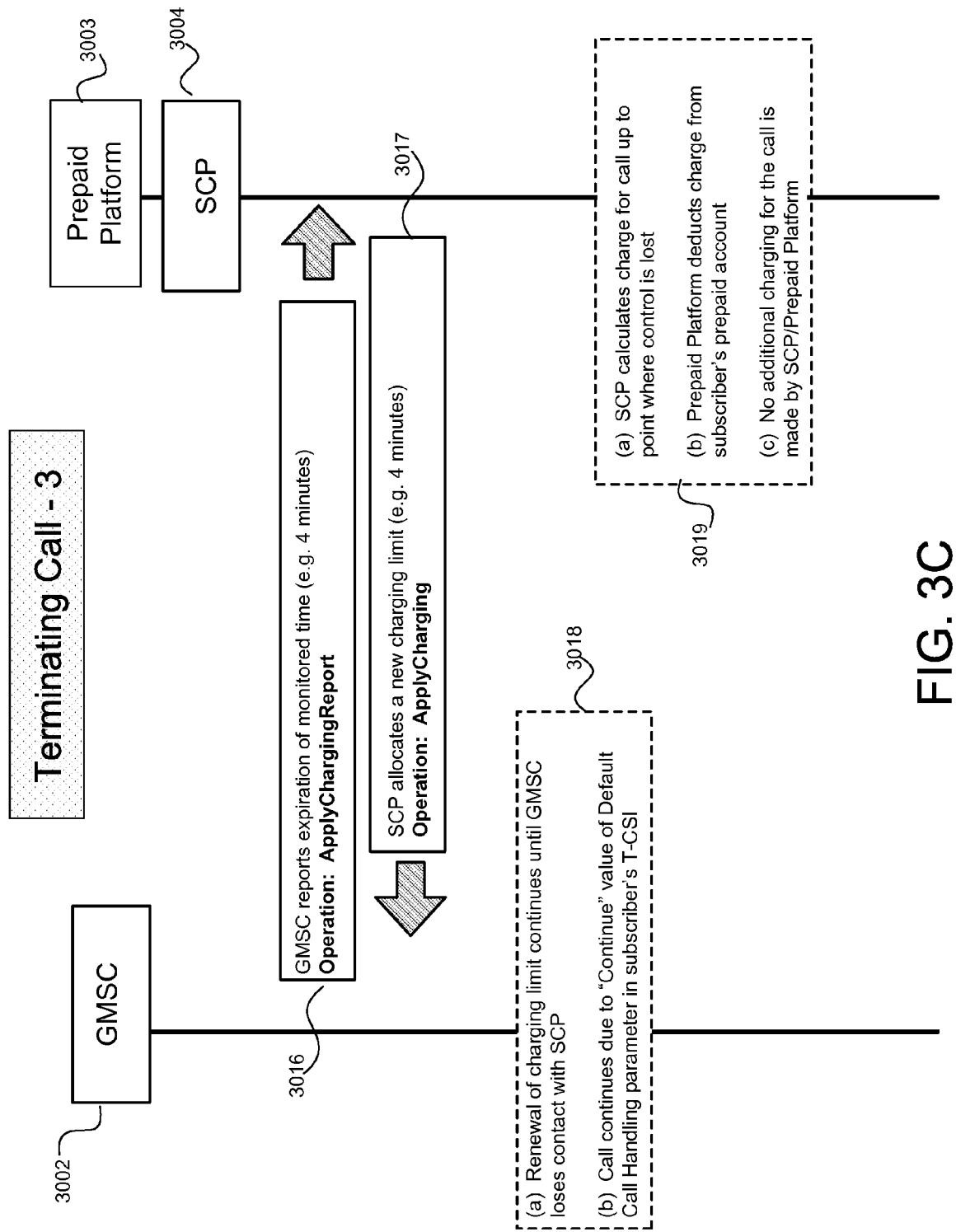

FIGS. 3A-3C depict a similar call processing flow in a conventional terminating call that continues after the GMSC loses contact with the SCP. In similar fashion as with an originating call, call processing for a terminating call is accomplished by messages sent between HLR 3001, GMSC 3002, Prepaid Platform 3003, and SCP 3004.

As shown in FIG. 3A, a Terminating Call Request 3005, which is an incoming call to a prepaid mobile subscriber in a conventional CAMEL network, is directed to GMSC 3002. At step 3006, the Terminating Call Request 3005 is intercepted, and GMSC 3002 sends a SendRoutingInformation message to HLR 3001 and receives the terminating subscriber's Terminating CAMEL Subscription Information (T-CSI). Also at this step, GMSC 3002 reads the value of the Default Call Handling parameter in the subscriber's T-CSI. As with the case of an originating call as described above, for this application, the Default Call Handling parameter is assumed to be set to "continue" so that the call will continue after the communication between GMSC 3002 and SCP 3004 fails and SCP 3004 loses the ability to charge for the call.

At step 3007 shown in FIG. 3A, in a conventional CAMEL terminating call, in Operation: InitialDetectionPoint, GMSC 3002 reports to SCP 3004 that it has detected a first TDP for the call, DP12-Terminating Attempt Authorized. In addition, as part of the processing, GMSC 3002 flags the "continue" value of the terminating subscriber's Default Call Handling parameter. Also at this step in call processing, SCP 3004 checks the prepaid mobile terminating subscriber's eligibility to receive the incoming call, for example by checking the prepaid subscriber's account balance to ensure that she has sufficient funds to cover the expected charges for the call. At step 3008, via Operation: RequestReportBCSMEvent SCP 3004 arms additional detection points for events at this point in the call, such as Answer, Busy, Abandon, etc., and instructs MSC 3002 to monitor for these events. At step 3009, SCP 3004 confirms that the prepaid terminating subscriber is eligible to receive the call and allows the call to proceed via Operation: Continue.

FIGS. 3B-3C depict additional terminating call processing in accordance with conventional methods in a terminating call that continues after failure of the CAMEL dialogue between the GMSC and the SCP. At step 3010, GMSC 3002 sends a second SendRoutingInformation message to HLR 3001 to obtain a temporary routable number known as Mobile Station Routing Number (MSRN) so that GMSC 3002 can route the call to the recipient, and call setup continues based on this MSRN. At step 3011, the prepaid mobile subscriber as terminating party answers the call, and at step 3012, GMSC 3002 reports this answer event to SCP 3004 via Operation: EventReportBCSM. In response to this message from the GMSC, at step 3013, SCP 3004 arms one or more detection points for future events in the call, for example, an Event Detection Point (EDP) for call disconnect, by sending an Operation: RequestReportBCSMEvent to GMSC 3002.

In addition, as discussed above in the context of an originating call, to ensure that a prepaid subscriber making an outgoing call does not exceed her prepaid account balance or otherwise become ineligible to continue the call, messaging between GMSC 3002 and SCP 3004 control call flow in segments so that the prepaid subscriber's eligibility to continue the call can be monitored. At step 3014 via Operation: ApplyCharging SCP 3004 allocates a charging limit time period to the prepaid call, advises GMSC 3002 of this charging limit time period, and instructs GMSC 3002 to monitor for its expiration. Via Operation: Continue at step 3015 SCP 2004 allows the call to proceed and instructs GMSC 3002 to propagate the answer to the calling party side.

Steps 3016 to 3019 shown in FIG. 3C are similar to corresponding steps 2015 to 2018 shown in FIGS. 2B-2C. At step 3016, GMSC 3002 reports to SCP 3004 via Operation: ApplyChargingReport that the allocated charging time period time has expired, and if the terminating subscriber remains eligible to continue the call, for example, because her prepaid account balance is sufficient, SCP 3004 allocates a second charging time period to the call by a second iteration of Operation: ApplyCharging in step 3017. As seen in step 3018 (*a*) in FIG. 3C, the allocation, monitoring, and renewal of charging time periods can continue in the terminating call until the CAMEL dialogue fails and GMSC 3002 loses contact with SCP 3004. In such a case, as seen in step 3018(*b*), the call continues due to the "continue" value of the Default Call Handling parameter, even after the CAMEL dialogue fails and the SCP can no longer control charging for the call.

As shown in step 3019, just as for an originating call, in a terminating call processed in accordance with conventional CAMEL methods, charges for the call that are incurred after the failure of the CAMEL dialogue are not recovered by the telecommunications network. Thus, at step 3019(*a*), after SCP 3004 loses contact with GMSC 3002, SCP 3004 calculates a charge for the call up to the point when the last ApplyChargingReport was received by SCP 3004 before the CAMEL dialogue failed, and at step 3019(*b*), Prepaid Platform 3003 deducts this amount from the terminating prepaid subscriber's prepaid account balance. As seen at step 3019(*c*), no additional charging for the call is made by the SCP or the Prepaid Platform and any revenue that would be due for the additional time that the call continues is lost.

In accordance with aspects and features described herein, there is provided a method and system to permit recovery of such lost revenue. Embodiments of aspects and features herein include new Trigger Detection Points, known as "O-Disconnect," to be used in an originating call, and "T-Disconnect," for use in a terminating call. These TDPs can be triggered when the call continues after the CAMEL dialogue between the MSC/GMSC and the SCP fails.

With reference to an originating call, in accordance with aspects and features described herein, when the O-Disconnect TDP is armed, the MSC's local time that the TDP is armed can be stored in the memory of the MSC. The MSC can also store the time the call was answered. The MSC then can continue to monitor for disconnection of the call, and when the disconnection occurs, the MSC can initiate a new CAMEL dialogue with the SCP by sending a new CAP message Operation: InitialDetectionPoint with the TDP O-Disconnect. This message also can include the GSM Call Reference Number for the call that had previously been reported to the SCP at call setup, the time that the TDP was armed (i.e., the time the call continued as a result of the "continue" Default Call Treatment parameter), and the time that the call was disconnected, and the time the original trigger, DP2-Collected Information was reported. Using this information, the SCP can associate the continued call with a call in its records, (i.e., the call before failure of the CAMEL dialogue) and can calculate charges for the time the call continued after the SCP lost contact. In this way, the SCP can charge for the entire duration of the call just as it would if there had not been a failure of the CAMEL dialogue with the MSC.

FIGS. 4A-4D depict an exemplary embodiment of a call processing method for a mobile originating call in a CAMEL network in an embodiment according to one or more aspects described herein. As shown in FIGS. 4A-4D, a mobile originating call in a CAMEL network according to aspect herein can involve an information flow between HLR 4001, MSC 4002, Prepaid Platform 4003, and SCP 4004.

Figure 4A:
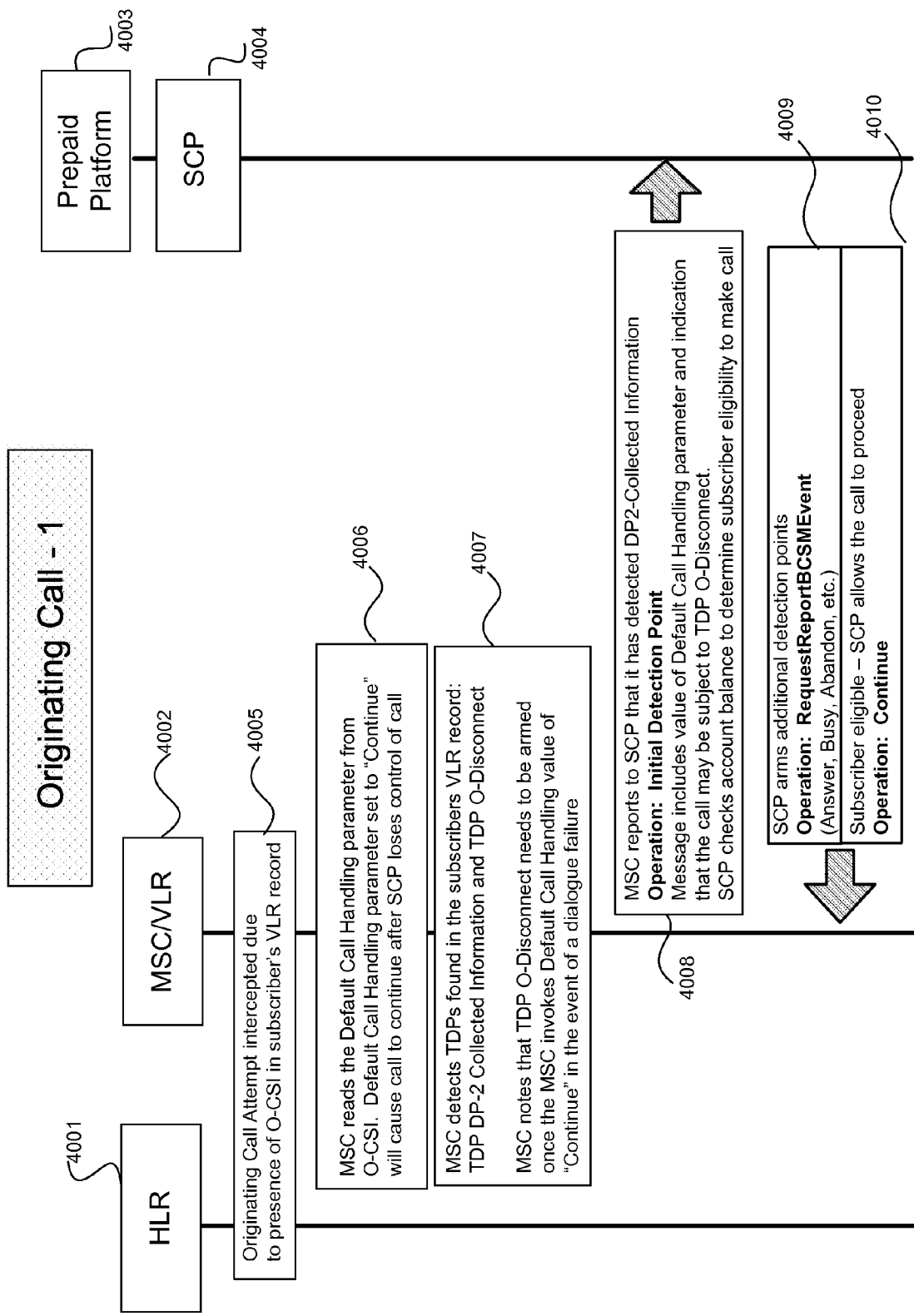
FIGS. 4A-4D depict an exemplary embodiment of a call flow in a CAMEL Originating Basic Call State Model in a mobile network according to one or more aspects described herein.

As shown in FIG. 4A, at step 4005 a prepaid subscriber's outgoing (originating) call can be intercepted due to the presence of Originating CAMEL Subscription Information (O-CSI) in the subscriber's record in the VLR. At step 4006, the MSC can read the value of the Default Call Handling parameter from the subscriber's O-CSI. For example, a "continue" value of the Default Call Handling parameter will cause the call to continue if the CAMEL dialogue between MSC 4002 and SCP 4004 fails, whereas a "release" value will cause the call to terminate. As noted above, for purposes of the present application, the value of the Default Call Handling parameter will always be assumed to be set to "continue."

In accordance with one or more aspects and features described herein, at step 4007, MSC 4002 can detect one or more Trigger Detection Points (TDPs) that can be armed in the prepaid mobile originating subscriber's HLR. In accordance with aspects herein, among these TDPs are the TDP "DP-2 Collected Information" and TDP "O-Disconnect." As seen in step 4007, MSC 4002 can note that the TDP O-Disconnect can be triggered if a mobile originating call continues after MSC 4002 loses contact with SCP 4004, whether due to a "continue" value of the Default Call Handling parameter or otherwise.

At step 4008, by means of CAP Operation: InitialDectionPoint, MSC 4002 can report to SCP 4004 that it has detected DP-2 Collected Information. As it is known in the art, the message includes several parameters including GSM Call Reference Number that can uniquely identify the call. As part of this message, MSC 4002 can also include the "continue" value of the Default Call Handling parameter, so that the SCP is aware of the fact that if the CAMEL dialogue between the MSC and the SCP fails, the call can continue. The message can also include an indication that the call can be subject to TDP O-Disconnect. At this point in the call, SCP 4004 also can check the eligibility of the prepaid subscriber to make the call, for example, by checking the amount in the subscriber's prepaid account to see if the subscriber has sufficient funds to cover the call. At step 4009, via Operation: RequestReportBCSMEvent SCP 4004 can arm one or more additional detection points for events at this point in the call, such as Answer, Busy, Abandon, etc., and can instruct MSC 4002 to monitor for these events. At step 4010, once the SCP 4004 has confirmed that the prepaid mobile originating subscriber is eligible to make the call it can allow the call to proceed via Operation: Continue.

Figure 4B:
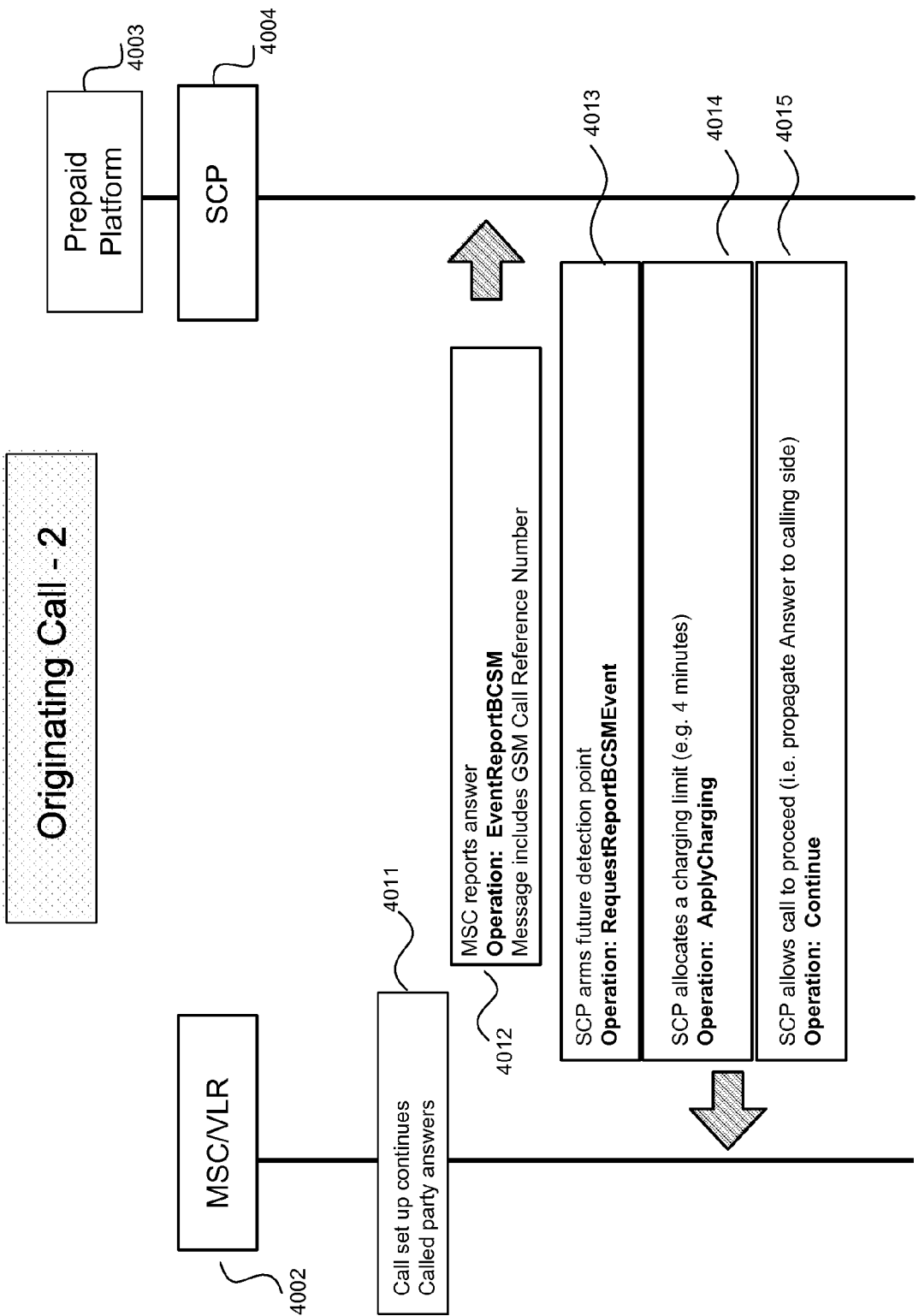

FIG. 4B depicts additional exemplary call processing steps in an embodiment of a mobile originating call according to one or more aspects described herein. At step 4011, the call setup can continue. After the called party answers the call, at step 4012 MSC 4002 can report to SCP 4004 via Operation: EventReportBCSM that the call has been answered. After the call has been answered, in accordance with one or more aspects herein, at steps 4013 through 4015, SCP 4004 can send several instructions to MSC 4002 regarding charging and monitoring of the call. At step 4013, SCP 4004 can arm one or more future detection points in the call. For example, SCP 4004 can arm an Event Detection Point (EDP) for call disconnect at step 4013 by sending Operation: RequestReportBCSMEvent to MSC 4002 and requesting MSC 4002 to monitor for this event.

In addition, to ensure that a prepaid subscriber making an outgoing call does not exceed her prepaid account balance or otherwise become ineligible to continue the call, messaging between MSC 4002 and SCP 4004 can control call flow in segments so that the prepaid mobile originating subscriber's eligibility to continue the call can be monitored. At step 4014 via Operation: ApplyCharging SCP 4004 can allocate a charging limit time period to the prepaid call, e.g. 4 minutes, can advise MSC 4002 of this charging limit time period, and can instruct MSC 4002 to monitor for its expiration. Once an initial charging limit time period has been set, at step 4015, SCP 4004 can allow the call to proceed by instructing MSC 4002 via Operation: Continue to propagate the answer to the calling party side.

Figure 4C:
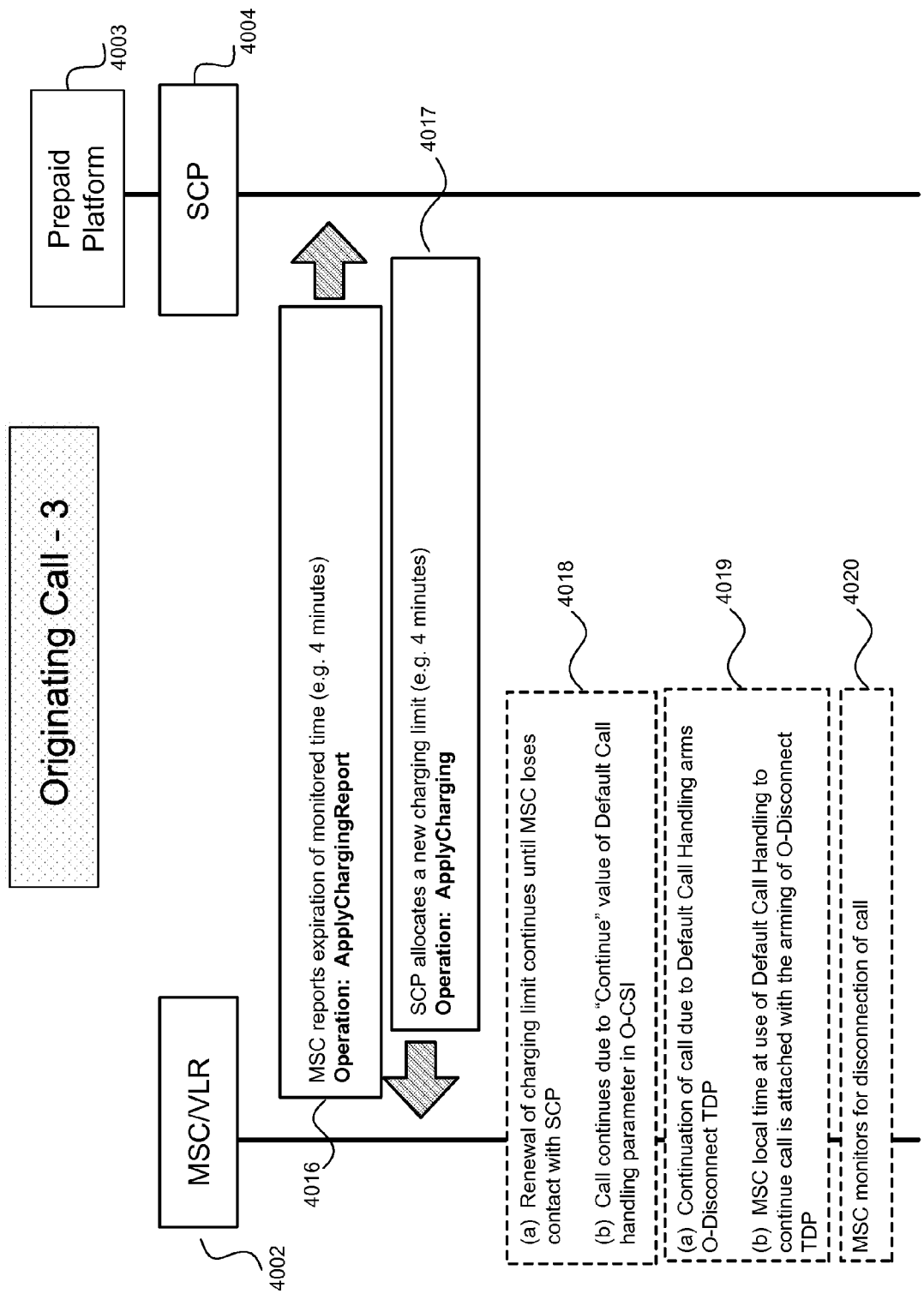

As seen in FIG. 4C, at step 4016, after the expiration of the initial 4-minute charging limit time period, MSC 4002 can report to SCP 4004 via Operation: ApplyChargingReport that the monitored time has expired. If the caller's prepaid account balance is sufficiently high to cover an additional period or the prepaid subscriber is otherwise eligible to continue the call, at step 4017, SCP 4004 can allocate an additional charging time period to the call, for example, another 4 minutes, and via a second iteration of Operation: ApplyCharging can advise MSC 4002 of this new charging limit period.

As seen in step 4018($a$), in accordance with one or more aspects described herein, the allocation, monitoring, and renewal of charging limits seen in steps 4014, 4016, and 4017 can continue until the CAMEL dialogue fails, i.e., until MSC 4002 loses contact with SCP 4004. It should be noted that the communication between MSC 4002 and SCP 4004 can be lost at any time during the call, even before the first allocated charging limit time period has expired. When such loss of communication between MSC 4002 and SCP 4004 occurs, in an embodiment in accordance with one or more aspects and features described herein, the call can be processed according to the value of the Default Call Handling parameter in the prepaid mobile originating subscriber's O-CSI read by the MSC at step 4006. Thus, if the value of the Default Call Handling parameter is set to "continue," at step 4018($b$), the call can continue, even if SCP 4004 no longer can control charging for the call.

As seen in step 4019($a$), in an embodiment of mobile originating call processing in accordance with one or more aspects and features described herein, continuation of the call following failure of the CAMEL dialogue due to the "continue" value of the Default Call Handling parameter can arm the "O-Disconnect" TDP that was previously found in the subscriber's VLR record. According to one or more aspects and features described herein, as seen in step 4019($b$), upon the arming of the O-Disconnect TDP, MSC 4002 can store the time at which the O-Disconnect TDP was armed in memory, for example, memory 1002C shown in FIG. 1. Pursuant to the "continue" value of the Default Call Handling parameter, the call can continue, and as seen in step 4020, MSC 4002 can monitor the call to detect when the call is disconnected.

Figure 4D:
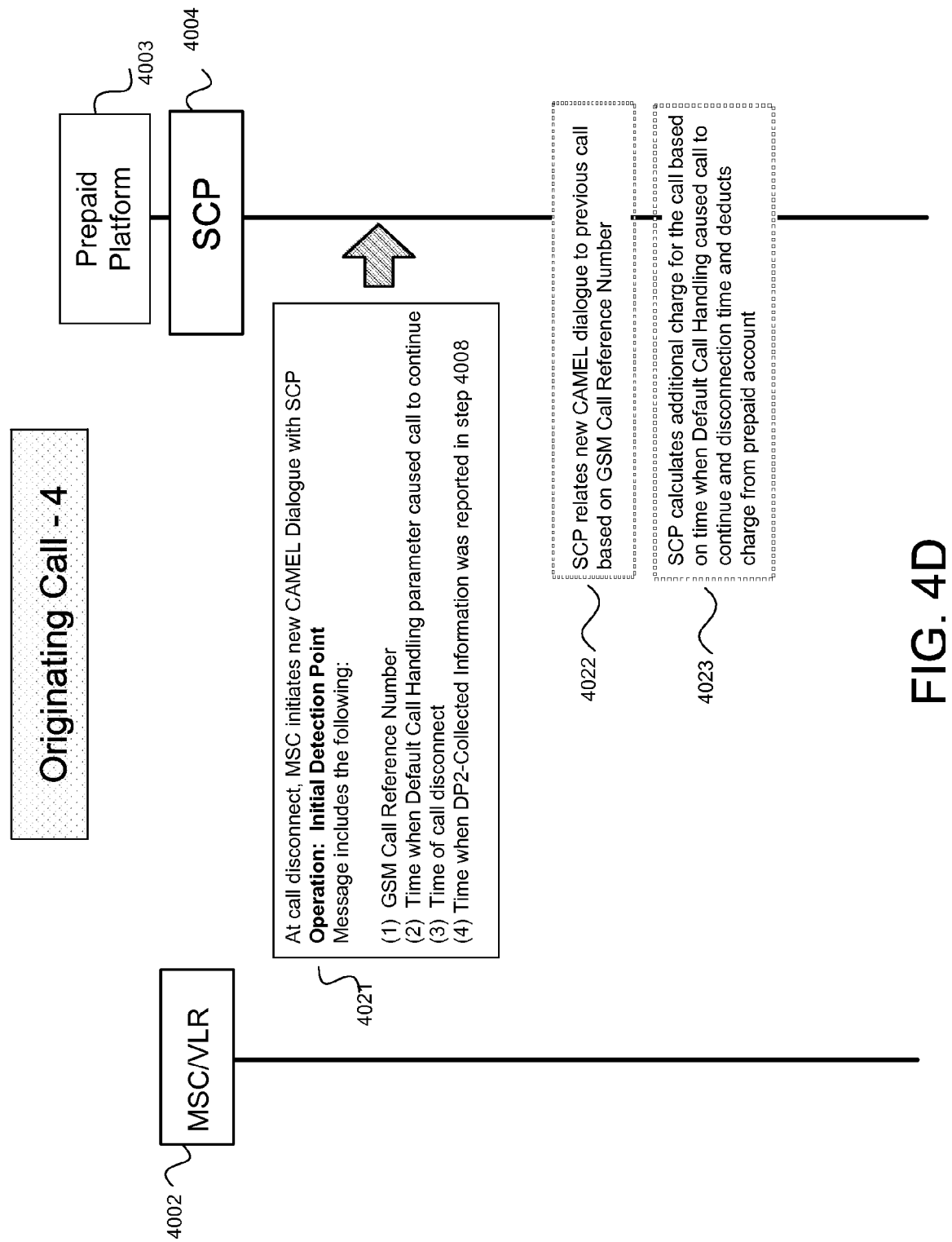

As seen in FIG. 4D, in an embodiment of mobile originating call processing in a CAMEL network in accordance with aspects and features described herein, at step 4021, upon disconnection of the call, MSC 4002 can initiate a new CAMEL dialogue with SCP 4004 by a new CAP operation Operation: InitialDetectionPoint. This CAP message to SCP 4004, MSC 4002 can include the following information: (1) the GSM Call Reference Number previously sent to SCP 4004 at step 4008; (2) the MSC local time when the Default Call Handling parameter caused the call to continue upon failure of the CAMEL dialogue; (3) the MSC local time that the call was disconnected; and (4) the time when the DP2-Collected Information was reported in Step 4008.

In accordance with one or more aspects and features described herein, as seen in step 4022, upon receipt of this information, SCP 4004 can correlate this new CAMEL dialogue to a previous call based on the GSM Call Reference Number, and additionally, based on the time when DP2-Collected Information was reported in Step 4008. In addition, as seen in step 4023, SCP 4004 can use the time information reported by MSC 4002 to determine a time period in the call for which charging needs to be made, can calculate a charge for that time period, and can add that charge to the charges previously determined for the call before the SCP 4004 lost contact with the call. In this way, SCP 4004 can calculate a charge for the entire duration of the call in real- or near-real time and can deduct the charge from the prepaid mobile originating subscriber's prepaid account with little or no delay.

FIGS. 5A-5D depict an exemplary embodiment of a similar call processing method for a mobile terminating call in a CAMEL network according to one or more aspects described herein. In similar fashion as with an originating call, call processing for a terminating call is accomplished by messages sent between HLR 5001, GMSC 5002, Prepaid Platform 5003, and SCP 5004.

Figure 5A:
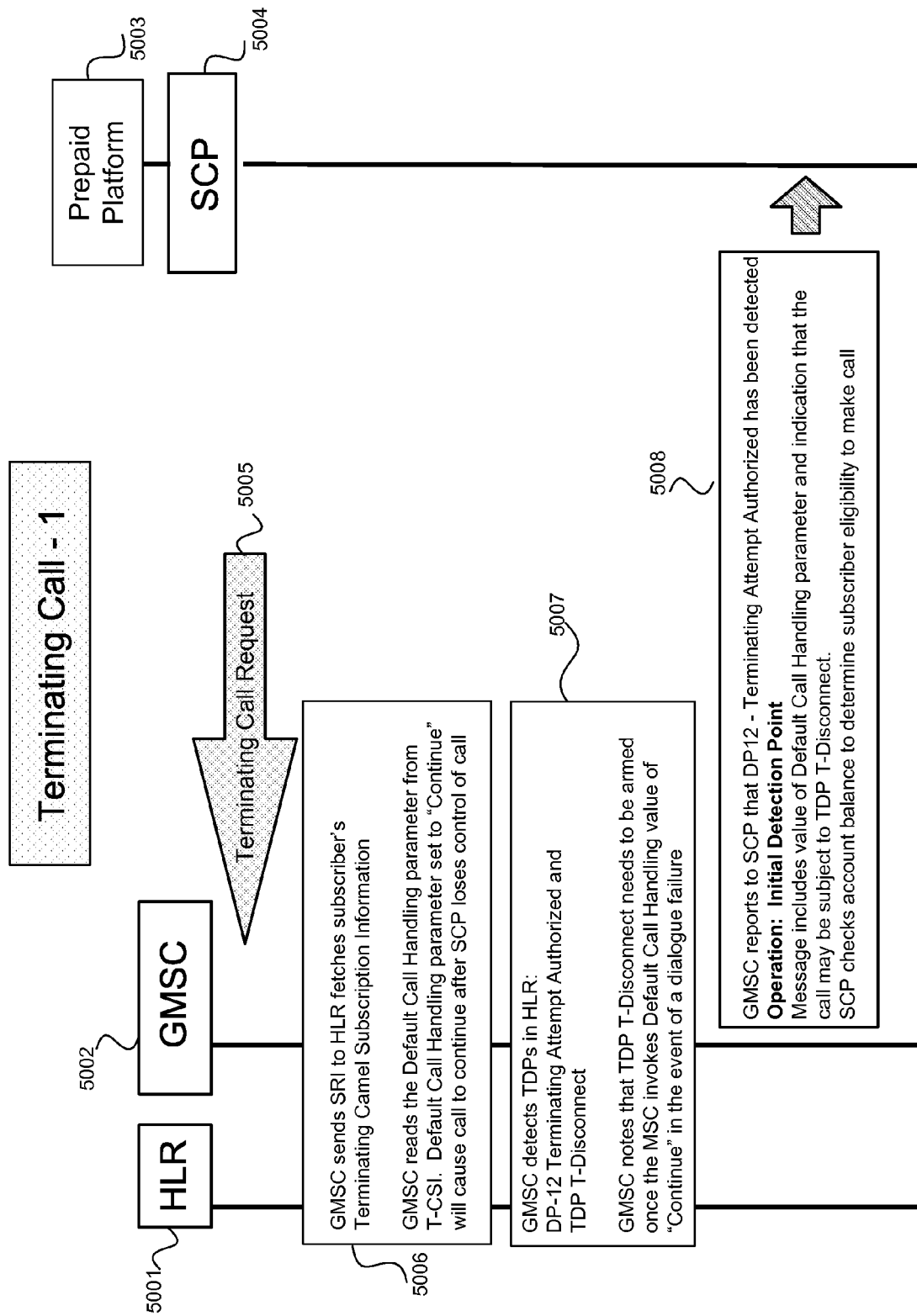

As shown in FIG. 5A, a Terminating Call Request 5005 to a prepaid mobile subscriber in a CAMEL network according to one or more aspects described herein is directed to GMSC 5002. At step 5006, the Terminating Call Request 5005 is intercepted, and in accordance with aspects described herein, also at step 5006 GMSC 5002 can send a SendRoutingInformation message to HLR 5001 to fetch the terminating subscriber's Terminating CAMEL Subscription Information (T-CSI). Also at this step, GMSC 5002 cam read the value of the Default Call Handling parameter in the subscriber's T-CSI. As with the case of an originating call as described above, for this application, the Default Call Handling parameter is assumed to be set to "continue" so that the call will continue after the communication between GMSC 5002 and SCP 5004 fails and SCP 5004 loses the ability to charge for the call.

In accordance with one or more aspects and features described herein, at step 5007, GMSC 5002 can detect one or more Trigger Detection Points (TDPs) that can be armed in the prepaid mobile terminating subscriber's HLR. In accordance with aspects herein, among these TDPs are the TDP "DP-12 Terminating Attempt Authorized" and the TDP "T-Disconnect." As seen in step 5007, GMSC 5002 can note that the TDP T-Disconnect can be armed if a mobile terminating call continues after GMSC 5002 loses contact with SCP 5004, whether due to a "continue" value of the Default Call Handling parameter or otherwise.

In step 5008 in an embodiment of terminating call processing according to one or more aspects and features herein, in Operation: InitialDetectionPoint, GMSC 5002 can report to SCP 5004 that it has detected a first TDP for the call, for example, DP12-Terminating Attempt Authorized. As it is known in the art, the message includes several parameters including GSM Call Reference Number that can uniquely identify the call. In addition, as part of this message, GMSC 5002 can advise SCP 5004 of the "continue" value of the Default Call Handling parameter so that the SCP is aware of the fact that the call can continue if messaging between GMSC 5002 and SCP 5004 fails. The message can also include an indication that the call can be subject to TDP T-Disconnect. Also at this step in call processing, SCP 5004 can check the prepaid mobile terminating subscriber's eligibility to receive the incoming call, for example by checking the prepaid subscriber's account balance to ensure that she has sufficient funds to cover the expected charges for the call.

Figure 5B:
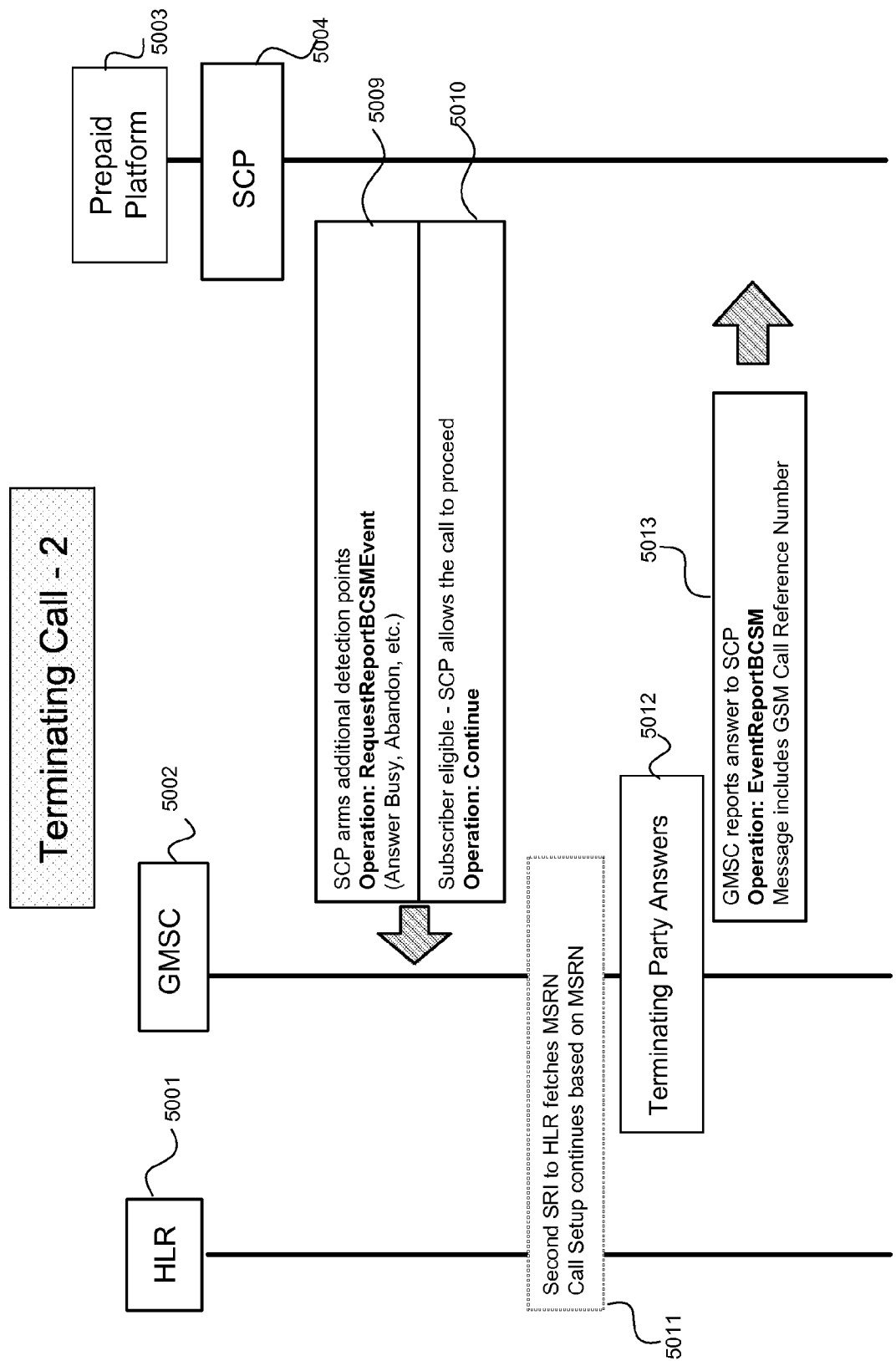
Figure 5D:
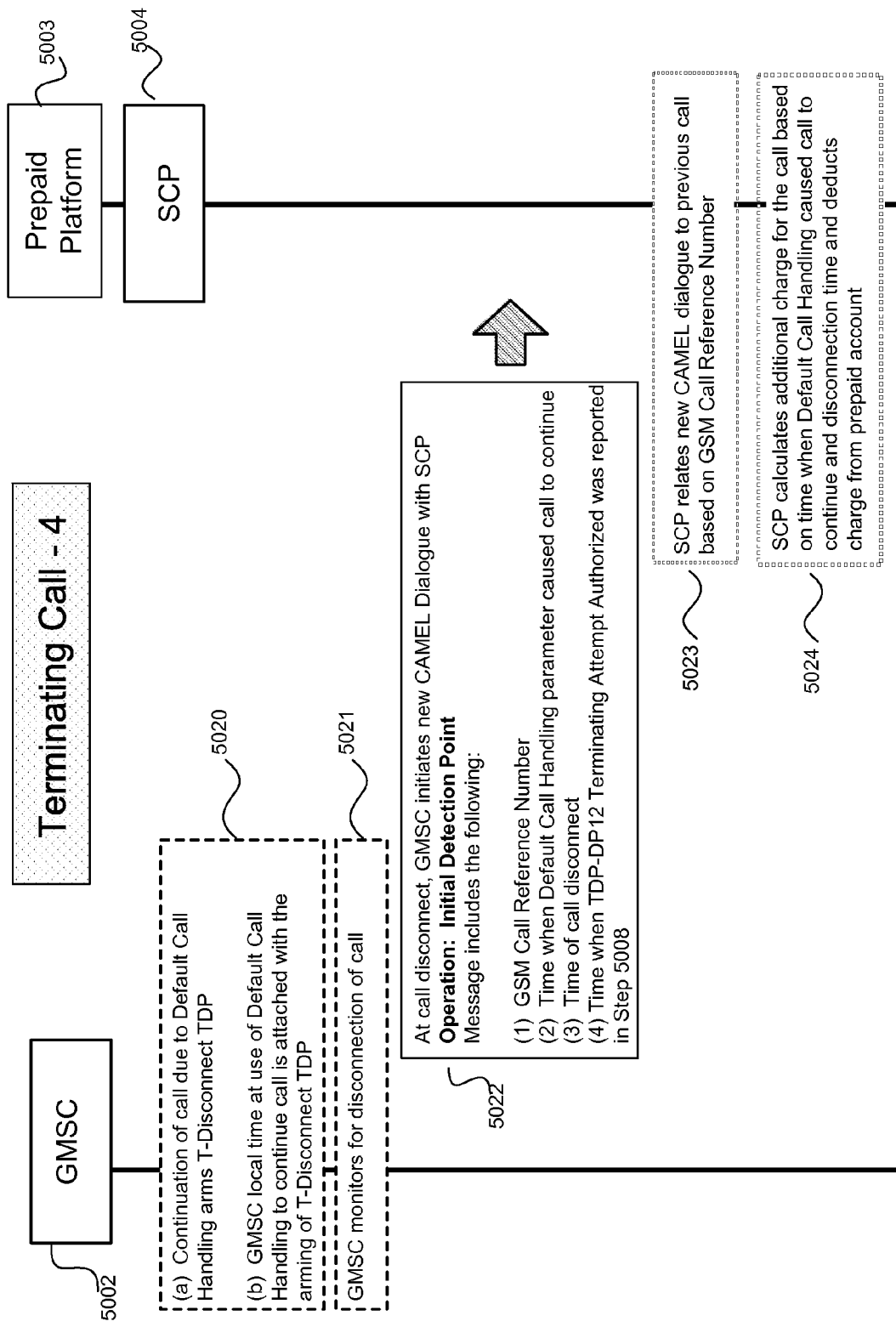

FIGS. 5B-5D depict additional terminating call processing steps in accordance with an embodiment according to one or more aspects described herein. At step 5009, via Operation: RequestReportBCSMEvent SCP 5004 can arm additional detection points for events at this point in the call, such as Answer, Busy, Abandon, etc., and can instruct MSC 5002 to monitor for these events. At step 5010, SCP 5004 can confirm that the prepaid terminating subscriber is eligible to receive the call, and once this eligibility has been confirmed, SCP 5004 can allow the call to proceed via Operation: Continue.

At step 5011, GMSC 5002 can send a second SendRoutingInformation message to HLR 5001 to obtain a temporary routable number known as Mobile Station Routing Number (MSRN) so that GMSC 5002 can route the call to the recipient, and call setup can continue based on this MSRN. At step 5012, the prepaid mobile subscriber as terminating party can answer the call. At step 5013, GMSC 5002 can report this answer event to SCP 5004 via Operation: EventReportBCSM.

In response to this message from the GMSC, at step 5014 in FIG. 5C, SCP 5004 can arm one or more detection points for future events in the call, for example, an Event Detection Point (EDP) for call disconnect, by sending an Operation: RequestReportBCSMEvent to GMSC 5002. In addition, as discussed above in the context of an originating call, to ensure that a prepaid subscriber making an outgoing call does not exceed her prepaid account balance or otherwise become ineligible to continue the call, messaging between GMSC 5002 and SCP 5004 can control call flow in segments so that the prepaid subscriber's eligibility to continue the call can be monitored. At step 5015 via Operation: Apply Charging SCP 5004 can allocate a charging limit time period to the prepaid call, can advise GMSC 5002 of this charging limit time period, and can instruct GMSC 5002 to monitor for its expiration. Via Operation: Continue at step 5016 SCP 2004 can allow the call to proceed and can instruct GMSC 5002 to propagate the answer to the calling party side.

At step 5017, GMSC 5002 can report to SCP 5004 via Operation: ApplyChargingReport that the allocated charging time period time has expired, and if the terminating subscriber remains eligible to continue the call, for example, because her prepaid account balance is sufficient SCP 5004 can allocate a second charging time period to the call by a second iteration of Operation: ApplyCharging in step 5018. As seen in step 5019(*a*) in FIG. 5, the allocation, monitoring, and renewal of charging time periods can continue in the terminating call until the CAMEL dialogue fails and GMSC 5002 loses contact with SCP 5004. In such a case, as seen in step 5019(*b*), the call can continue due to the "continue" value of the Default Call Handling parameter, even after the CAMEL dialogue fails and the SCP can no longer control charging for the call.

FIG. 5D depicts additional call processing steps in an embodiment of a mobile terminating call according to one or more aspects herein. As seen in step 5020(*a*), in accordance with one or more aspects and features described herein, continuation of the call following failure of the CAMEL dialogue due to the "continue" value of the Default Call Handling parameter can arm the "T-Disconnect" TDP that was previously retrieved from HLR. According to one or more aspects and features described herein, as seen in step 5020(*b*), upon the triggering of the T-Disconnect TDP, GMSC 5002 can store the local time at which the T-Disconnect TDP was triggered in memory, for example, memory 1006B shown in FIG. 1. Pursuant to the "continue" value of the Default Call Handling parameter, the call can continue, and as seen in step 5021, GMSC 5002 can monitor the call to detect when the call is disconnected. At step 5022, upon disconnection of the call, GMSC 5002 can initiate a new CAMEL dialogue with SCP 5004 by a new CAP operation Operation: InitialDetectionPoint. In this CAP message to SCP 5004, MSC 5002 can include the following information: (1) the GSM Call Reference Number previously sent to SCP 5004 at step 5008; (2) the GMSC local time when the Default Call Handling parameter caused the call to continue upon failure of the CAMEL dialogue; and (3) the GMSC local time that the call was disconnected; and (4) the time when the DP12-Termination Attempt Authorized was reported in Step 5008.

In addition, in accordance with one or more aspects and features described herein, as seen in step 5023, upon receipt of this information, SCP 5004 can correlate this new CAMEL dialogue to a previous call based on the GSM Call Reference Number, and additionally, based on the time when DP12-Termination Attempt Authorized was reported in Step 5008. In addition, as seen in step 5024, SCP 5004 can use the time information reported by GMSC 5002 to calculate a time period for which charging needs to be calculated, can calculate a charge for that time period and add that charge to the charges previously determined for the call before the SCP 5004 lost contact with the call. In this way, SCP 5004 can calculate a charge for the entire duration of the call in real time and can deduct the charge from the prepaid mobile originating subscriber's prepaid account with little or no delay.

Thus, in accordance with aspects and features described herein, the SCP can calculate charges due for an entire duration of a prepaid originating or terminating call, even after the SCP loses contact with the MSC/GMSC and cannot control the allocation of time periods and charging for the call. In this way, more of the revenue for such calls can be recovered, which can result in an improved economic posture for the network.

While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

I claim:

1. A method for processing a call in a telecommunications network, comprising:
   receiving a request for a call associated with a prepaid mobile subscriber in a telecommunications network;
   receiving a signal indicative of a trigger detection point associated with the call, said trigger detection point being configured to control processing of the call if a control signal associated with the call is not received;
   transmitting a unique call identifier associated with said call to a processor associated with the call;
   receiving a signal indicative of an arming of said trigger detection point;
   storing a first time value of said arming of said trigger detection point in a memory;
   receiving a signal indicative of a disconnection of the call;
   storing a second time value of said disconnection in said memory;
   transmitting said unique call identifier, said first time value, and said second time value to said processor;
   said processor previously calculating a first charge for the call; and
   said processor calculating a second charge for the call, said second charge being based on said first time value and said second time value, and further comprising said first processor associating the first charge with the second charge to provide a total charge for the call, the total charge being based on the first charge and the second charge.

2. The method for processing a call in a telecommunications network according to claim 1, wherein said call is an outgoing call originated by said prepaid mobile subscriber.

3. The method for processing a call in a telecommunications network according to claim 1, wherein said call is an incoming call directed to said prepaid mobile subscriber as a terminating party to the call.

4. The method for processing a call in a telecommunications network according to claim 1, said trigger detection point being associated with a triggering criterion, said trigger detection point being armed only if said triggering criterion is met.

5. The method for processing a call in a telecommunications network according to claim 4, said triggering criterion being met only if a default call parameter associated with the call is configured to cause the call to continue if a control signal associated with the call is not received.

6. The method for processing a call in a telecommunications network according to claim 1, wherein said processor associates the first charge with the second charge based on the unique call identifier.

7. The method for processing a call in a telecommunications network according to claim 1, further comprising receiving at least one signal indicative of a CAMEL operation.

8. A method for determining a charge for a prepaid call in a telecommunications network, comprising:
   receiving, at a service control point, a first signal indicative of a trigger detection point associated with a prepaid call in a telecommunications network, the trigger detection point being configured to control processing of the prepaid call if a signal associated with the call is not received;
   receiving, at the service control point, a unique call identifier associated with the call;
   receiving, at the service control point, a signal indicative of a first time value, said first time value being indicative of a time of arming of the trigger detection point;
   receiving, at the service control point, a signal indicative of a second time value, said second time value being indicative of a time of disconnection of the call;
   calculating, at the service control point, a first charge for the call, the first charge being based on said first and second time values; and
   associating the first charge with a previously calculated second charge for the call to provide a total charge for the call, the total charge being based on the first charge and the previously calculated second charge.

9. The method for determining a charge for a prepaid call according to claim 8, wherein said prepaid call is an outgoing call placed by a prepaid subscriber.

10. The method for determining a charge for a prepaid call according to claim 8, wherein said prepaid call is an incoming call to a prepaid subscriber as a terminating party to the call.

11. The method for processing a call in a telecommunications network according to claim 8, said trigger detection point being associated with a triggering criterion, said trigger detection point being armed only if said triggering criterion is met.

12. The method for processing a call in a telecommunications network according to claim 11, said triggering criterion being met only if a default call parameter associated with the call is configured to cause the call to continue if a control signal associated with the call is not received.

13. The method for determining a charge for a prepaid call according to claim 8, further comprising receiving at least one signal indicative of a CAMEL operation.

14. A method for charging a prepaid call in a CAMEL telecommunications network, comprising:
   receiving, at a mobile switching center, information of a trigger detection point associated with a prepaid call in a CAMEL telecommunications network, the trigger detection point being configured to control processing of the prepaid call if a control signal associated with the call is not received from a service control point;
   transmitting, from said mobile switching center, a unique call identifier associated with said call to said service control point;
   receiving, at said mobile switching center, a signal indicative of an arming of said trigger detection point;
   storing, in memory at said mobile switching center, a first time value of said arming of said trigger detection point and a second time value of a disconnection of the call;
   transmitting, from said mobile switching center to said service control point, a signal indicative of said unique call identifier, said first time value, and said second time value;
   determining, at said service control point, a first charge for said prepaid call, said first charge being based on said first time value and said second time value; and
   associating said first charge with a second charge for said prepaid call, said second charge having previously been determined at said service control point, to provide a total charge for said call, said total charge being based on said first charge and said second charge.

15. The method for processing a call in a telecommunications network according to claim 14, said trigger detection point being associated with a triggering criterion, said trigger detection point being armed only if said triggering criterion is met.

16. The method for processing a call in a telecommunications network according to claim 15, said triggering criterion being met only if a default call parameter associated with the call is configured to cause the call to continue if a control signal associated with the call is not received.

17. The method for charging a prepaid call in a CAMEL telecommunications network according to claim 14, further comprising:

receiving, at said service control point, a unique call identifier for said prepaid call; and associating said first charge and second charges for said prepaid call based on said unique call identifier.

18. The method for charging a prepaid call in a CAMEL telecommunications network according to claim 14, wherein said prepaid call is an outgoing call originated by a prepaid mobile subscriber in said telecommunications network.

19. The method for charging a prepaid call in a CAMEL telecommunications network according to claim 14, wherein said prepaid call is an incoming call directed to a prepaid mobile subscriber as terminating party to said call, and further wherein said mobile switching center comprises a gateway mobile switching center in said telecommunications network.

\* \* \* \* \*

UNITED STATES PATENT AND TRADEMARK OFFICE
CERTIFICATE OF CORRECTION

| | | |
|---|---|---|
| PATENT NO. | : 8,180,321 B2 | Page 1 of 1 |
| APPLICATION NO. | : 11/861339 | |
| DATED | : May 15, 2012 | |
| INVENTOR(S) | : Mustafa Anwar Kazmi | |

It is certified that error appears in the above-identified patent and that said Letters Patent is hereby corrected as shown below:

In column 15, line 15, replace --a call-- with "the call";
line 16, replace --in a-- with "in the".

In column 16, line 2, replace --a prepaid-- with "the prepaid";
line 3, replace --in a-- with "in the";
line 44, replace --a prepaid call in a-- with "the prepaid call in the".

Signed and Sealed this
Eleventh Day of September, 2012

David J. Kappos
*Director of the United States Patent and Trademark Office*